United States Patent
Damghanian et al.

(10) Patent No.: US 12,301,878 B2
(45) Date of Patent: May 13, 2025

(54) VIRTUAL BOUNDARY SIGNALING

(71) Applicant: Telefonaktiebolaget LM Ericsson (publ), Stockholm (SE)

(72) Inventors: Mitra Damghanian, Upplands-Bro (SE); Martin Pettersson, Vallentuna (SE); Rickard Sjöberg, Stockholm (SE); Zhi Zhang, Solna (SE); Jack Enhorn, Kista (SE); Ruoyang Yu, Täby (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 17/916,488

(22) PCT Filed: Mar. 30, 2021

(86) PCT No.: PCT/EP2021/058380
§ 371 (c)(1),
(2) Date: Sep. 30, 2022

(87) PCT Pub. No.: WO2021/198309
PCT Pub. Date: Oct. 7, 2021

(65) Prior Publication Data
US 2023/0179803 A1 Jun. 8, 2023

Related U.S. Application Data

(60) Provisional application No. 63/004,175, filed on Apr. 2, 2020.

(51) Int. Cl.
*H04N 7/12* (2006.01)
*H04N 19/172* (2014.01)
(Continued)

(52) U.S. Cl.
CPC .......... *H04N 19/70* (2014.11); *H04N 19/172* (2014.11); *H04N 19/46* (2014.11)

(58) Field of Classification Search
CPC ...... H04N 19/70; H04N 19/172; H04N 19/46; H04N 19/117; H04N 19/82
See application file for complete search history.

(56) References Cited

U.S. PATENT DOCUMENTS

2021/0203971 A1* 7/2021 Chen .................... H04N 19/117
2021/0203972 A1* 7/2021 Chen .................... H04N 19/105
(Continued)

FOREIGN PATENT DOCUMENTS

WO 2019060443 A1 3/2019

OTHER PUBLICATIONS

International Search Report and Written Opinion issued in International Application No. PCT/EP2021/058380 dated May 7, 2021 (13 pages).
(Continued)

*Primary Examiner* — Gims S Philippe
(74) *Attorney, Agent, or Firm* — Rothwell, Figg, Ernst & Manbeck, P.C.

(57) ABSTRACT

A method for decoding a picture comprising a virtual boundary from a coded video bitstream. The method includes determining one or more of a maximum picture width or a maximum picture height from one or more syntax elements S1 in the coded video bitstream and determining one or more of a current picture width or a current picture height from one or more syntax elements S2 in the coded video bitstream. The method also includes determining that a virtual boundary syntax element in the coded video bitstream is encoded with a bit length derived from (i) one or more of the maximum picture width or the maximum picture height or (ii) one or more of the current picture width
(Continued)

or the current picture height. The method also includes deriving the bit length for the virtual boundary syntax element based on (i) the one or more of the maximum picture width or maximum picture height as a result of determining that a virtual boundary syntax element in the coded video bitstream is encoded with a bit length derived from one or more of the maximum picture width or the maximum picture height or (ii) the one or more of the current picture width or the current picture height as a result of determining that a virtual boundary syntax element in the coded video bitstream is derived from one or more of the current picture width or the current picture height. The method also includes decoding the virtual boundary syntax element from the bitstream based on the derived bit length and determining a spatial picture position of the virtual boundary based on the decoded virtual boundary syntax element.

21 Claims, 10 Drawing Sheets

(51) Int. Cl.
*H04N 19/46* (2014.01)
*H04N 19/70* (2014.01)

(56) References Cited

U.S. PATENT DOCUMENTS

| | | | |
|---|---|---|---|
| 2021/0274204 A1* | 9/2021 | He | H04N 19/187 |
| 2021/0306626 A1* | 9/2021 | Choi | H04N 19/157 |
| 2021/0360289 A1* | 11/2021 | He | H04N 19/119 |
| 2023/0007253 A1* | 1/2023 | Wang | H04N 19/12 |

OTHER PUBLICATIONS

DSouza, A., "[AHG17] Signaling of Uniform Virtual Boundaries", JVET—O0445m48565, Jul. 2019 (8 pages).

Chen, J. et al. (Alibaba-Inc) J et al: "AHG8/AHG9: On SPS level virtual boundary", 17. JVET Meeting; Jan. 7, 2020-Jan. 17, 2020; Brussels; (The Joint Video Exploration Team of ISO/IEC JTC1/SC29/WG11 and ITU-T SG.16 ), No. JVET-Q0417; m52012 Jan. 12, 2020 (15 pages).

Sheng-Yen Lin, "CE-13 related: Loop Filter Disabled across Virtual Boundaries" Joint Video Experts Team (JVET) of ITU-T SG 16 WP 3 and ISO/IEC JTC 1/SC 29/WG 11, 13th Meeting: Marrakech, MA, Jan. 2019, (17 pages).

* cited by examiner

VIRTUAL BOUNDARY SIGNALING

CROSS REFERENCE TO RELATED APPLICATIONS

This application is a 35 U.S.C. § 371 National Stage of International Patent Application No. PCT/EP2021/058380, filed Mar. 30, 2021, which claims priority of U.S. Provisional Patent Application No. 63/004,175, filed on Apr. 2, 2020. The above identified applications are incorporated by this reference.

TECHNICAL FIELD

Disclosed are embodiments related to virtual boundary signaling.

BACKGROUND

HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized, and then entropy coded before being transmitted together with necessary prediction parameters such as prediction mode and motion vectors, also entropy coded. The decoder performs entropy decoding, inverse quantization, and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC).

Components

A video sequence includes a series of images where each image includes one or more components. Each component can be described as a two-dimensional rectangular array of sample values. It is common that an image in a video sequence consists of three components: one luma component Y, where the sample values are luma values; and two chroma components Cb and Cr, where the sample values are chroma values. It is also common that the dimensions of the chroma components are smaller than the luma components by a factor of two in each dimension. For example, the size of the luma component of an HD image would be 19201080 and the chroma components would each have the dimension of 960×540. Components are sometimes referred to as color components.

Blocks and Units

A block is one two-dimensional array of samples. In video coding, each component is split into blocks and the coded video bitstream includes a series of coded blocks. It is common in video coding that the image is split into units that cover a specific area of the image. Each unit includes all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks". Alternatively, a block can be defined as a two-dimensional array that a single prediction mode is applied to. These blocks can be called "prediction blocks". In this application, the word block is not tied to one of these definitions but that the descriptions herein can apply to either definition.

Temporal Layers

In HEVC and in the VVC draft, all pictures are associated with a TemporalId value which specifies what temporal layer the picture belongs to. TemporalId values are decoded from the nuh_temporal_id_plus1 syntax element in the NAL unit header. The encoder is required to set TemporalId values such that pictures belonging to a lower layer is perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC specification that the encoder must comply with. For instance, it is not allowed for a picture of a temporal layer to reference a picture of a higher temporal layer.

Picture Header

In the current version of VVC a coded picture contains a picture header (PH). The picture header currently contains parameters that are common for all slices of the associated picture. The picture header may be signaled in its own NAL unit with NAL unit type PH_NUT or included in the slice header given that there is only one slice in the picture. This is indicated by the slice header syntax element picture_header_in_slice_header_flag, where a value equal to 1 specifies that the picture header is included in the slice header and a value equal to 0 specifies that the picture header is carried in its own NAL unit. For a CVS where not all pictures are single-slice pictures, each coded picture must be preceded by a picture header that is signaled in its own NAL unit. HEVC does not support picture headers.

Parameter Sets

HEVC specifies three types of parameter sets, the picture parameter set (PPS), the sequence parameter set (SPS), and the video parameter set (VPS). The PPS contains data that is common for a whole picture, the SPS contains data that is common for a coded video sequence (CVS), and the VPS contains data that is common for multiple CVSs.

VVC also uses these parameter set types. In VVC, there is also the adaptation parameter set (APS) and the decoding capability information (DCI) which in previous versions of VVC was called decoding parameter set (DPS). The APS may contain information that can be used for multiple slices and two slices of the same picture can use different APSes. The DCI consists of information specifying the "worst case" in terms of profile and level that the decoder will encounter in the entire bitstream.

Sequence Parameter Set (SPS)

In VVC a SPS contains parameters which are applied to an entire coded layer video sequence (CLVS). A CLVS is a sequence of pictures belonging to the same layer starting from an intra random access point (IRAP) picture or gradual decoding refresh (GDR) picture. A CVS in VVC may contain one or more CLVSs. For all pictures within the same CLVS, the same SPS is used. The SPS is identified by a SPS_id (sps_seq_parameter_set_id).

Picture Parameter Set (PPS)

A PPS contains parameters that may change from picture to picture within the same CLVS. The parameters signaled in PPS mainly include parameters for different enabled coding tools.

VVC Block Structure

The draft VVC video coding standard uses a block structure referred to as quadtree plus binary tree plus ternary tree block structure (QTBT+TT) where each picture is first partitioned into square blocks called coding tree units (CTU). The size of all CTUs are identical and the partition is done without any syntax controlling it. Each CTU is further partitioned into coding units (CU) that can have either square or rectangular shapes. The CTU is first partitioned by a quad tree structure, then it may be further partitioned with equally sized partitions either vertically or horizontally in a binary structure to form coding units (CUs). A block could thus have either a square or rectangular shape. The depth of the quad tree and binary tree can be set by the encoder in the bitstream. An example of dividing a CTU using QTBT is illustrated in FIG. 1. The ternary tree (TT) part adds the possibility to divide a CU into three partitions instead of two equally sized partitions; this increases the possibilities to use a block structure that better fits the content structure in a picture.

VVC Virtual Boundaries

Virtual boundaries are boundaries that might affect in-loop filtering processes. In-loop filtering operations include the deblocking filter, sample adaptive offset filter, and adaptive loop filter operations. These operations may be disabled at virtual boundaries.

In the current VVC specification (JVET-Q2001-vE) information of virtual boundaries is signaled in the SPS or in the PH.

One use case for virtual boundaries is 360-degree video with cube map projection. In cube map projection, the 360 sphere is mapped to six cube faces, where each face represents one side of a cube. The cube faces are often packed into one rectangular picture. Some borders between the packed cube faces do not have continuous content. If in-loop filtering is enabled across these borders there may be visible artifacts once the cube faces are stitched together for projection. Virtual boundaries may be used to disable the in-loop filtering for these borders.

Another use case for virtual boundaries is for gradual decoding refresh (GDR) where the video may be partially refreshed picture-by-picture over a specified refresh period. By dividing the pictures into refreshed and non-refreshed areas using virtual boundaries, instead of for instance rectangular slices, the compression efficiency may be significantly improved.

The following shows the syntax and semantics related to virtual boundaries when they are signaled in the SPS:

| | Descriptor |
|---|---|
| seq_parameter_set_rbsp( ) { | |
| ... | |
|    sps_virtual_boundaries_enabled_flag | u(1) |
|    if( sps_virtual_boundaries_enabled_flag ) { | |
|      sps_virtual_boundaries_present_flag | u(1) |
|      if( sps_virtual_boundaries_present_flag ) { | |
|        sps_num_ver_virtual_boundaries | u(2) |
|        for( i = 0; i < sps_num_ver_virtual_boundaries; i++ ) | |
|          sps_virtual_boundaries_pos_x[ i ] | u(13) |
|        sps_num_hor_virtual_boundaries | u(2) |
|        for( i = 0; i < sps_num_hor_virtual_boundaries; i++ ) | |
|          sps_virtual_boundaries_pos_y[ i ] | u(13) |
|      } | |
|    } | |
| ... | | sps_virtual_boundaries_enabled_flag equal to 1 specifies that disabling in-loop filtering across virtual boundaries may be applied in the coded pictures in the CLVS. sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations.

sps_virtual_boundaries_present_flag equal to 1 specifies that information of virtual boundaries is signaled in the SPS. sps_virtual_boundaries_present_flag equal to 0 specifies that information of virtual boundaries is not signaled in the SPS. When there is one or more than one virtual boundaries signaled in the SPS, the in-loop filtering operations are disabled across the virtual boundaries in pictures referring to the SPS. In-loop filtering operations include the deblocking filter, sample adaptive offset filter, and adaptive loop filter operations.

It is a requirement of bitstream conformance that when the value of res_change_in_clvs_allowed_flag is equal to 1, the value of sps_virtual_boundaries_present_flag shall be equal to 0.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] specifies the location of the i-th vertical virtual boundary in units of luma samples divided by 8. The value of sps_virtual_boundaries_pos_x[i] shall be in the range of 1 to Ceil(pic_width_max_in_luma_samples÷8)−1, inclusive.

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0.

sps_virtual_boundaries_pos_y[i] specifies the location of the i-th horizontal virtual boundary in units of luma samples divided by 8. The value of sps_virtual_boundaries_pos_y[i] shall be in the range of 1 to Ceil(pic_height_max_in_luma_samples÷8)−1, inclusive.

The following shows the syntax and semantics related to virtual boundaries when they are signaled in the PH:

| | Descriptor |
|---|---|
| picture_header_structure( ) { | |
| ... | |
|   if( sps_virtual_boundaries_enabled_flag && !sps_virtual_boundaries_present_flag ) { | |
|    ph_virtual_boundaries_present_flag | u(1) |
|    if( ph_virtual_boundaries_present_flag ) { | |
|      ph_num_ver_virtual_boundaries | u(2) |
|      for( i = 0; i < ph_num_ver_virtual_boundaries; i++ ) | |
|        ph_virtual_boundaries_pos_x[ i ] | u(13) |
|      ph_num_hor_virtual_boundaries | u(2) |
|      for( i = 0; i < ph_num_hor_virtual_boundaries; i++ ) | |
|        ph_virtual_boundaries_pos_y[ i ] | u(13) |
|    } | |
|   } | |
| ... | |
| } | | ph_virtual_boundaries_present_flag equal to 1 specifies that information of virtual boundaries is signaled in the PH. ph_virtual_boundaries_present_flag equal to 0 specifies that information of virtual boundaries is not signaled in the PH. When there is one or more than one virtual boundaries signaled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

VirtualBoundariesPresentFlag=0 if(sps_virtual_boundaries_enabled_flag)

VirtualBoundariesPresentFlag=sps_virtual_boundaries_present_flag||ph_virtual_boundaries_present_flag    (82)

ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

NumVerVirtualBoundaries=0 if(sps_virtual_boundaries_enabled_flag)

NumVerVirtualBoundaries=sps_virtual_boundaries_present_flag?sps_num_ver_virtual_boundaries:ph_num_ver_virtual_boundaries    (83)

ph_virtual_boundaries_pos_x[i] specifies the location of the i-th vertical virtual boundary in units of luma samples divided by 8. The value of ph_virtual_boundaries_pos_x[i] shall be in the range of 1 to Ceil(pic_width_in_luma_samples÷8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

for(i=0; i<NumVerVirtualBoundaries; i++)

VirtualBoundariesPosX[i]=(sps_virtual_boundaries_present_flag?sps_virtual_boundaries_pos_x[i]:ph_virtual_boundaries_pos_x[i])*8    (84)

The distance between any two vertical virtual boundaries shall be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

NumHorVirtualBoundaries=0 if(sps_virtual_boundaries_enabled_flag)

NumHorVirtualBoundaries=sps_virtual_boundaries_present_flag?sps_num_hor_virtual_boundaries: ph_num_hor_virtual_boundaries    (85)

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples÷8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

for(i=0; i<NumHorVirtualBoundaries; i++)

VirtualBoundariesPosY[i]=(sps_virtual_boundaries_present_flag?sps_virtual_boundaries_pos_y[i]:ph_virtual_boundaries_pos_y[i])*8    (86)

The distance between any two horizontal virtual boundaries shall be greater than or equal to CtbSizeY luma samples.

SUMMARY

A coded video bitstream is an ordered sequence of syntax elements. In the current VVC specification (JVET-Q2001-vE), the four syntax elements used for signaling the x and y locations of the vertical and horizontal virtual boundaries, which are sps_virtual_boundaries_pos_x[i], sps_virtual_boundaries_pos_y[i], ph_virtual_boundaries_pos_x[i], and ph_virtual_boundaries_pos_y[i] are signaled using 13 bit fixed-length codewords each, using so-called u(13) descriptors. 13 bits is enough to cover a width or height equal to $8 \times 2^{13} = 64$ k luma samples, which is much larger than most commonly used picture sizes (e.g., picture width and/or height), and hence u(13) is bit-cost inefficient.

In the current VVC specification, the bit counts of both the SPS and the PH are considerably higher than in HEVC (the PH did not exist in HEVC, but comparisons can be made using the total bit counts of the PH and the slice header in VVC against the bit counts of the slice header in HEVC), which makes it desirable in general to reduce the SPS and PH bit counts with reasonable means.

A previous proposed solution to VVC of signaling the location information of the virtual boundaries with a bit count adaptable to the picture size (e.g., picture width and/or height) is not suitable for the case where the virtual boundary information is signaled in the SPS because the picture size (e.g., picture width and/or height) may not be known when parsing the SPS.

In embodiments described herein, the locations of the virtual boundaries are signaled with a number of bits adapted to the picture size if the virtual boundary information is signaled in the PH and adapted to the maximum picture size of the decoded pictures referring to the SPS if the virtual boundary information is signaled in the SPS. In the current VVC draft, the maximum picture size of the decoded pictures referring to the SPS is signaled in the SPS by two syntax elements pic_width_max_in_luma_samples and pic_height_max_in_luma_samples; and the picture size is signaled in the PPS by two syntax elements pic_width_in_luma_samples and pic_height_in_luma_samples.

Accordingly, in one aspect there is provided a method for decoding a picture comprising a virtual boundary from a coded video bitstream. The method includes determining one or more of a maximum picture width or a maximum picture height from one or more syntax elements S1 in the coded video bitstream and determining one or more of a current picture width or a current picture height from one or more syntax elements S2 in the coded video bitstream. The method also includes determining that a virtual boundary syntax element in the coded video bitstream is encoded with a bit length derived from (i) one or more of the maximum picture width or the maximum picture height or (ii) one or more of the current picture width or the current picture height. The method also includes deriving the bit length for the virtual boundary syntax element based on (i) the one or more of the maximum picture width or maximum picture height as a result of determining that a virtual boundary syntax element in the coded video bitstream is encoded with a bit length derived from one or more of the maximum picture width or the maximum picture height or (ii) the one or more of the current picture width or the current picture height as a result of determining that a virtual boundary syntax element in the coded video bitstream is derived from one or more of the current picture width or the current picture height. The method also includes decoding the virtual boundary syntax element from the bitstream based on the derived bit length and determining a spatial picture position of the virtual boundary based on the decoded virtual boundary syntax element.

In another embodiment a method for decoding a current picture comprising a virtual boundary from a coded video bitstream includes determining one or more of a maximum picture width or a maximum picture height from one or more syntax elements S1 in the coded video bitstream and determining one or more of a current picture width or a current picture height from one or more syntax elements S2 in the coded video bitstream. The method also includes decoding a first syntax element from the coded video bitstream into a first value, wherein the first value specifies whether a spatial position of the virtual boundary is decoded using one or more of the maximum picture width or the maximum picture height, or one or more of the current picture width or the current picture height. The method also includes, in response to determining that the first value is equal to a value that specifies that a spatial position of the virtual boundary is decoded using one or more of the maximum picture width or the maximum picture height, deriving a bit length for a virtual boundary syntax element based on one of the maximum picture width and the maximum picture height. The method also includes, in response to determining that the first value is equal to a value that specifies that a spatial position of the virtual boundary is decoded using one or more of the current picture width or the current picture height, deriving a bit length for the virtual boundary syntax element based on one or more of the current picture width or the current picture height. The method also includes decoding the virtual boundary syntax element by reading N bits from the coded video bitstream, wherein N is equal to the derived bit length for the virtual boundary syntax element. The method also includes determining a spatial picture position of the virtual boundary based on the decoded virtual boundary syntax element and decoding the current picture using the spatial position of the virtual boundary.

In another aspect there is provided a computer program comprising instructions which when executed by processing circuitry of a decoder causes the decoder to perform the decoding methods disclosed herein. In another aspect there is provided a carrier containing the computer program, wherein the carrier is one of an electronic signal, an optical signal, a radio signal, and a computer readable storage medium.

In another aspect there is provided a decoder, where the decoder is configured to perform the decoding methods disclosed herein. In some embodiments, the decoder includes processing circuitry and a memory containing instructions executable by the processing circuitry, whereby the decoder is configured to perform the decoding methods disclosed herein.

In another aspect there is provided a method for encoding a picture comprising a virtual boundary to form a coded video bitstream. The method includes determining one or more of a maximum picture width and a maximum picture height and determining one or more of a current picture width and a current picture height. The method also includes determining to encode a virtual boundary syntax element in the coded video bitstream with a bit length derived from (i) one or more of the maximum picture width or the maximum picture height or (ii) one or more of the current picture width or the current picture height. The method also includes deriving the bit length for the virtual boundary syntax element based on (i) the one or more of the maximum picture width or maximum picture height as a result of determining to encode a virtual boundary syntax element in the coded video bitstream with a bit length derived from one or more of the maximum picture width or the maximum picture height or (ii) the one or more of the current picture width or current picture height as a result of determining to encode a virtual boundary syntax element in the coded video bitstream with a bit length derived from one or more of a current picture width or a current picture height. The method also includes determining the virtual boundary syntax element based on a spatial picture position of the virtual boundary and encoding the virtual boundary syntax element in the coded video bitstream based on the derived bit length.

In another aspect there is provided a computer program comprising instructions which when executed by processing circuitry of an encoder causes the encoder to perform the encoding methods disclosed herein. In another aspect there is provided a carrier containing the computer program, wherein the carrier is one of an electronic signal, an optical signal, a radio signal, and a computer readable storage medium.

In another aspect there is provided an encoder, where the encoder is configured to perform the encoding methods disclosed herein. In some embodiments, the encoder includes processing circuitry and a memory containing instructions executable by the processing circuitry, whereby the encoder is configured to perform the encoding methods disclosed herein.

The embodiments disclosed herein are advantageous in that they reduce the bit cost for signaling the locations of the virtual boundaries in the SPS and PH.

BRIEF DESCRIPTION OF THE DRAWINGS

The accompanying drawings, which are incorporated herein and form part of the specification, illustrate various embodiments.

DETAILED DESCRIPTION

The techniques described herein can be used for encoding a video sequence or decoding a coded video bitstream.

In the embodiments below, various methods have been described that improve upon the state of the art. It is to be understood by a person skilled in the art that two or more embodiments, or parts of embodiments, may be combined to form other embodiments which are within the scope of this disclosure.

In the embodiments below, the order a particular step is described in does not necessarily imply the order the step is performed in. Unless otherwise specified, the steps of the processes described below may be performed in any order.

In some embodiments, virtual boundary positions may be signaled using a syntax element whose bit length is derived from the current picture size (e.g., the current picture width and/or height) if the virtual boundary positions are signaled in the PH, or derived from the maximum picture size (e.g., maximum picture width and/or height) if the virtual boundary positions are signaled in the SPS.

Figure 1:
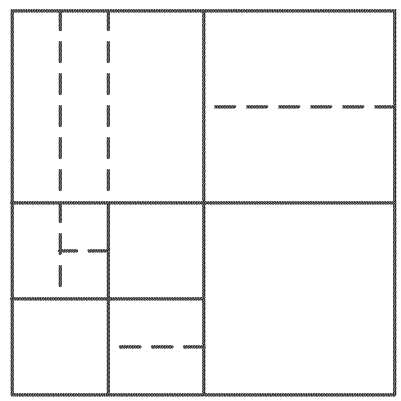
FIG. 1 illustrates an example of a coding tree unit using a quadtree plus binary tree structure.
Figure 1:
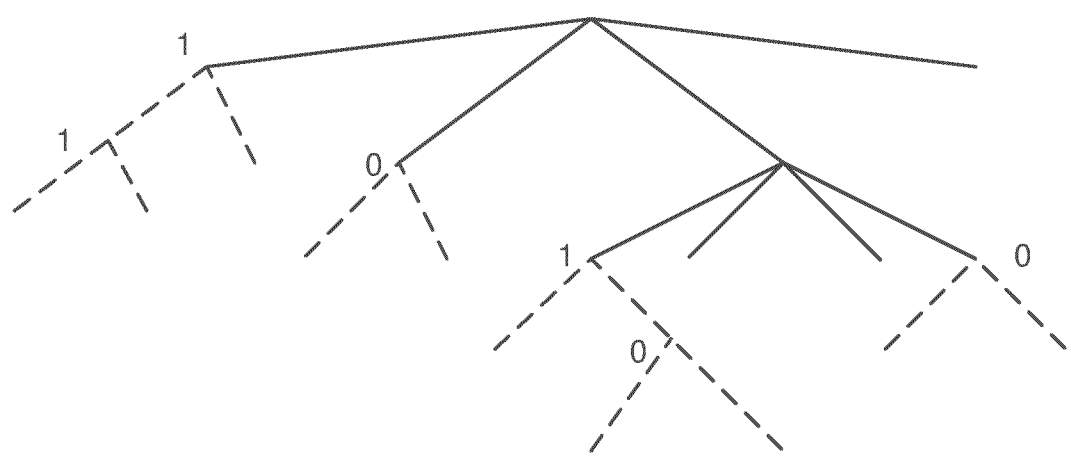
Figure 2:
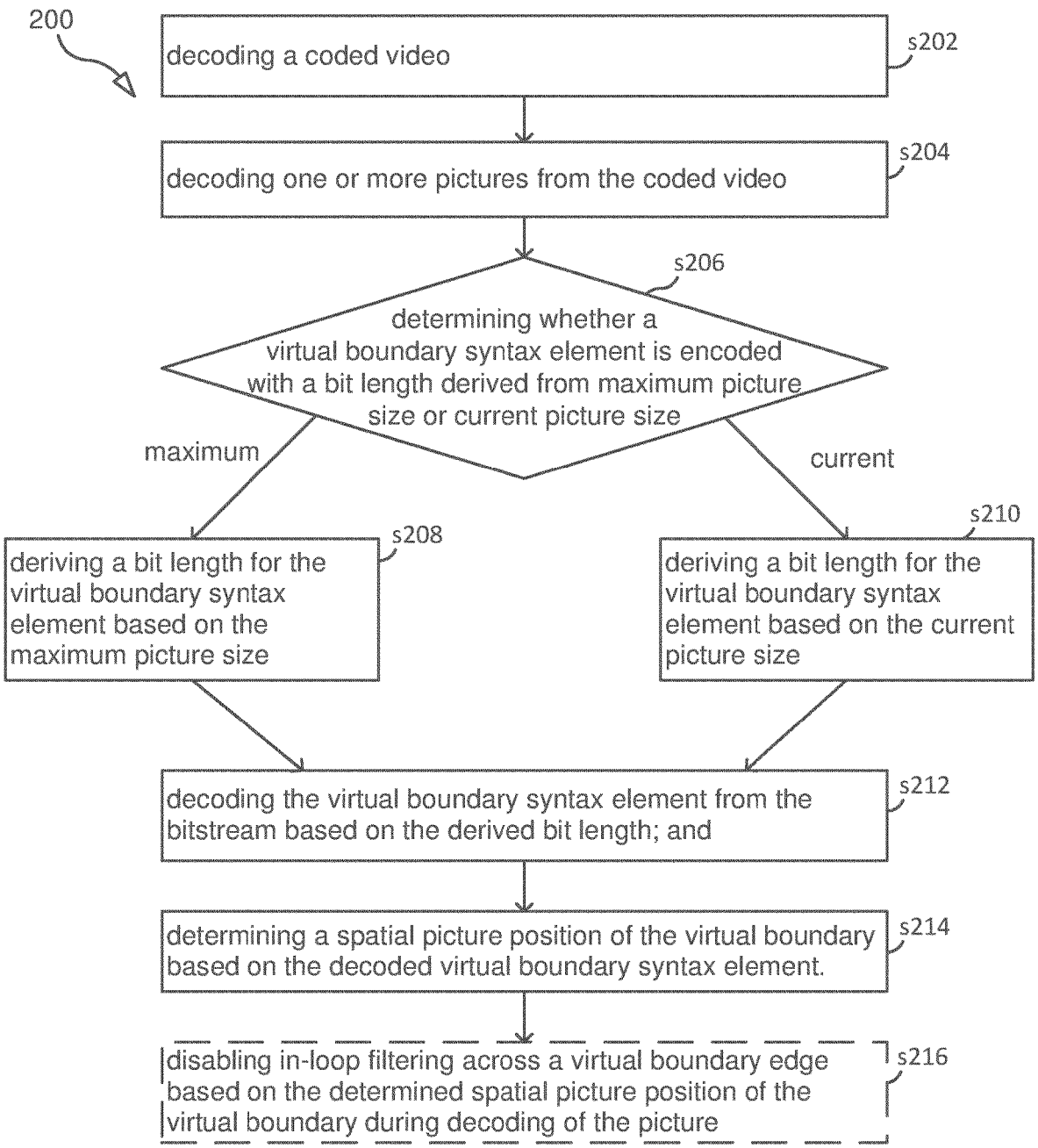
FIG. 2 is a flow chart of a decoding process according to an embodiment.

FIG. 2 illustrates a flow chart of a decoding process according to an embodiment. Process 200 may begin at step s202.

Step s202 comprises decoding a coded video. The coded video may include a number of different headers or parameter sets and a number of different pictures, each of which are encoded in a bitstream containing one or more syntax elements.

Step s204 comprises decoding one or more pictures from the coded video.

For example, the coded video may include a coded video sequence having a sequence of pictures for each of one or more layers.

Step s206 comprises determining whether a virtual boundary syntax element is encoded with a bit length derived from a maximum picture size (e.g., maximum picture height and/or width) or derived from a current picture size (e.g., current picture height and/or width). If the bit length is derived from the maximum picture size, then the process proceeds to step s208; otherwise, if the bit length is derived from the current picture size, the process proceeds to step s210. After step s208 or step s210 completes, the process may then proceed to step s212.

As described herein, there are a number of different ways to determine whether a virtual boundary syntax element is encoded with a bit length derived from a maximum picture size (e.g., maximum picture height and/or width) or derived from a current picture size (e.g., current picture height and/or width). Any of these ways are applicable to process 200. For example, process 200 may make this determination based on whether virtual boundary positions are signaled in the PH (meaning bit length is derived from current picture size) or in the SPS (meaning bit length is derived from maximum picture size). Alternatively, or in addition, process 200 may make this determination based on a flag indicating the presence of virtual boundary syntax elements in a particular header or parameter set, where the flag may itself be in said particular header or parameter set or in a different header or parameter set.

While decoding the coded video, it is possible that for some pictures in the coded video, the determination at step s206 results in one outcome (e.g., deriving bit length from maximum picture size), while for other pictures in the same coded video, the determination at step s206 results in a different outcome (e.g., deriving bit length from current picture size). In some embodiments, a determination made for one picture may apply to other similarly situated pictures. For example, if virtual boundaries are present in the SPS, then a determination for one picture associated with a given SPS is equally applicable to other pictures associated with the given SPS. On the other hand, if virtual boundaries are present in the PH of one picture, then a determination for that one picture may not be applicable to other pictures having potentially different PHs associated with them.

Both of step s208 and s210 comprise deriving a bit length for the virtual boundary syntax element. In step s208, the deriving is based on the maximum picture size (e.g., maximum picture height and/or width). In step s210, the deriving is based on the current picture size (e.g., current picture height and/or width).

Step s212 comprises decoding the virtual boundary syntax element from the bitstream based on the derived bit length.

Step s214 comprises determining a spatial picture position (e.g., an x position) of the virtual boundary based on the decoded virtual boundary syntax element.

Step s216 comprises disabling in-loop filtering across a virtual boundary edge (e.g., horizontal or vertical edge) based on the determined spatial picture position of the virtual boundary during decoding of the picture. Disabling in-loop filtering may include disabling all in-loop filtering, or only disabling some in-loop filtering.

Figure 3:
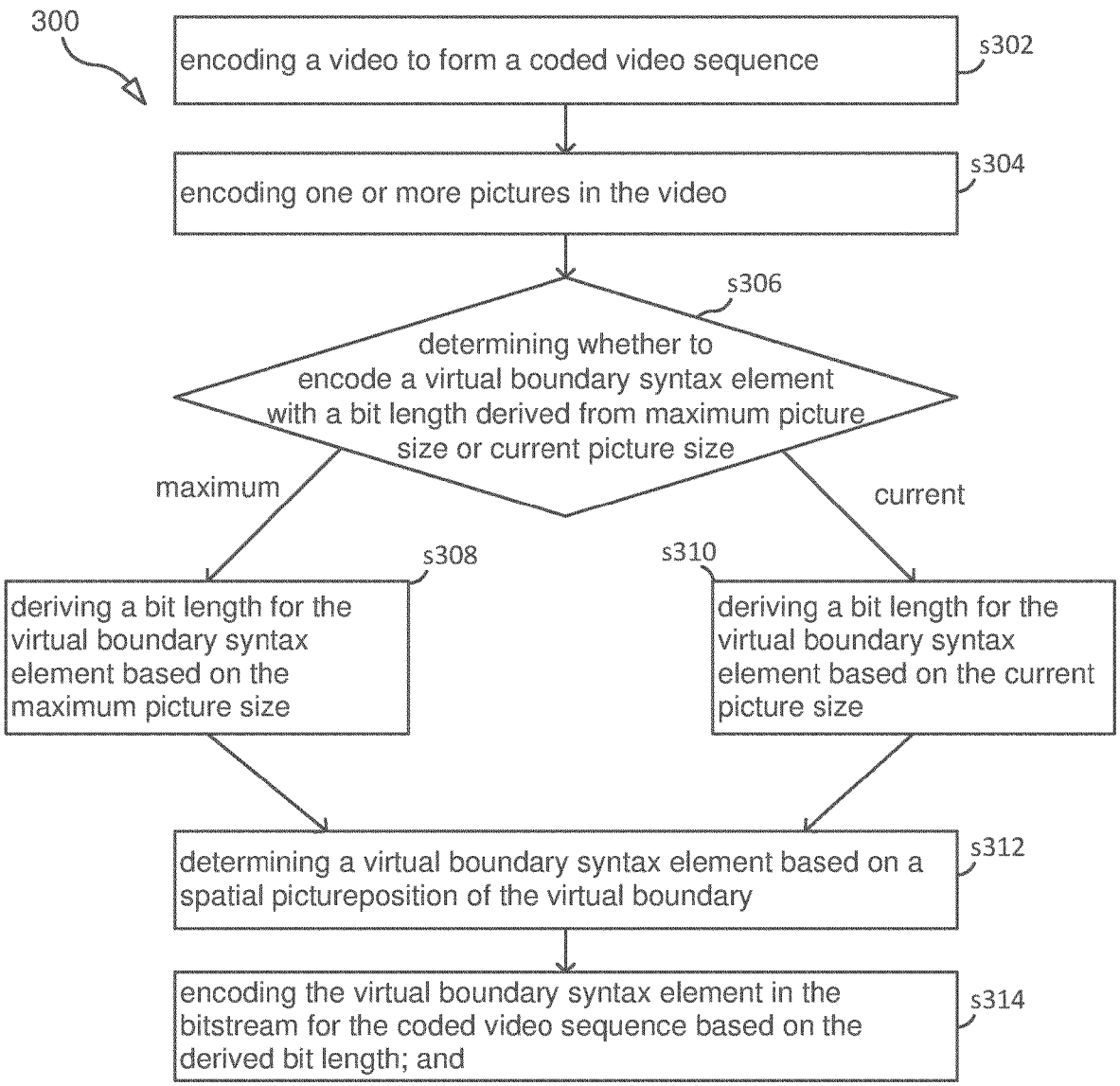
FIG. 3 is a flow chart of an encoding process according to an embodiment.

FIG. 3 illustrates a flow chart of an encoding process according to an embodiment. Process 300 may begin at step s302.

Step s302 comprises encoding a video to form a coded video. The video may include a number of different headers or parameter sets and a number of different pictures, each of which are encoded in a bitstream containing one or more syntax elements.

Step s304 comprises encoding one or more pictures in the video.

Step s306 comprises determining whether to encode a virtual boundary syntax element with a bit length derived from a maximum picture size (e.g., maximum picture height and/or width) or derived from a current picture size (e.g., current picture height and/or width). If the bit length is derived from the maximum picture size, then the process proceeds to step s308; otherwise, if the bit length is derived from the current picture size, the process proceeds to step s310. After step s308 or step s310 completes, the process may then proceed to step s312.

As described herein, there are a number of different ways to determine whether to encode a virtual boundary syntax element with a bit length derived from a maximum picture size (e.g., maximum picture height and/or width) or derived from a current picture size (e.g., current picture height and/or width). Any of these ways are applicable to process 300. For example, process 300 may make this determination based on whether virtual boundary positions are signaled in the PH (meaning bit length is derived from current picture size) or in the SPS (meaning bit length is derived from maximum picture size). Alternatively, or in addition, process 300 may make this determination based on a flag indicating the presence of virtual boundary syntax elements in a particular header or parameter set, where the flag may itself be in said particular header or parameter set or in a different header or parameter set.

While encoding the video, it is possible that for some pictures in the video, the determination at step s306 results in one outcome (e.g., deriving bit length from maximum picture size), while for other pictures in the same video, the determination at step s306 results in a different outcome (e.g., deriving bit length from current picture size). In some embodiments, a determination made for one picture may apply to other similarly situated pictures. For example, if virtual boundaries are present in the SPS, then a determination for one picture associated with a given SPS is equally applicable to other pictures associated with the given SPS. On the other hand, if virtual boundaries are present in the PH of one picture, then a determination for that one picture may not be applicable to other pictures having potentially different PHs associated with them.

Both of step s308 and s310 comprise deriving a bit length for the virtual boundary syntax element. In step s308, the deriving is based on the maximum picture size (e.g., maximum picture height and/or width). In step s310, the deriving is based on the current picture size (e.g., current picture height and/or width).

Step s312 comprises determining a virtual boundary syntax element based on a spatial picture position (e.g., an x position) of the virtual boundary.

Step s314 comprises encoding the virtual boundary syntax element in the bitstream for the coded video sequence based on the derived bit length.

Figure 4:
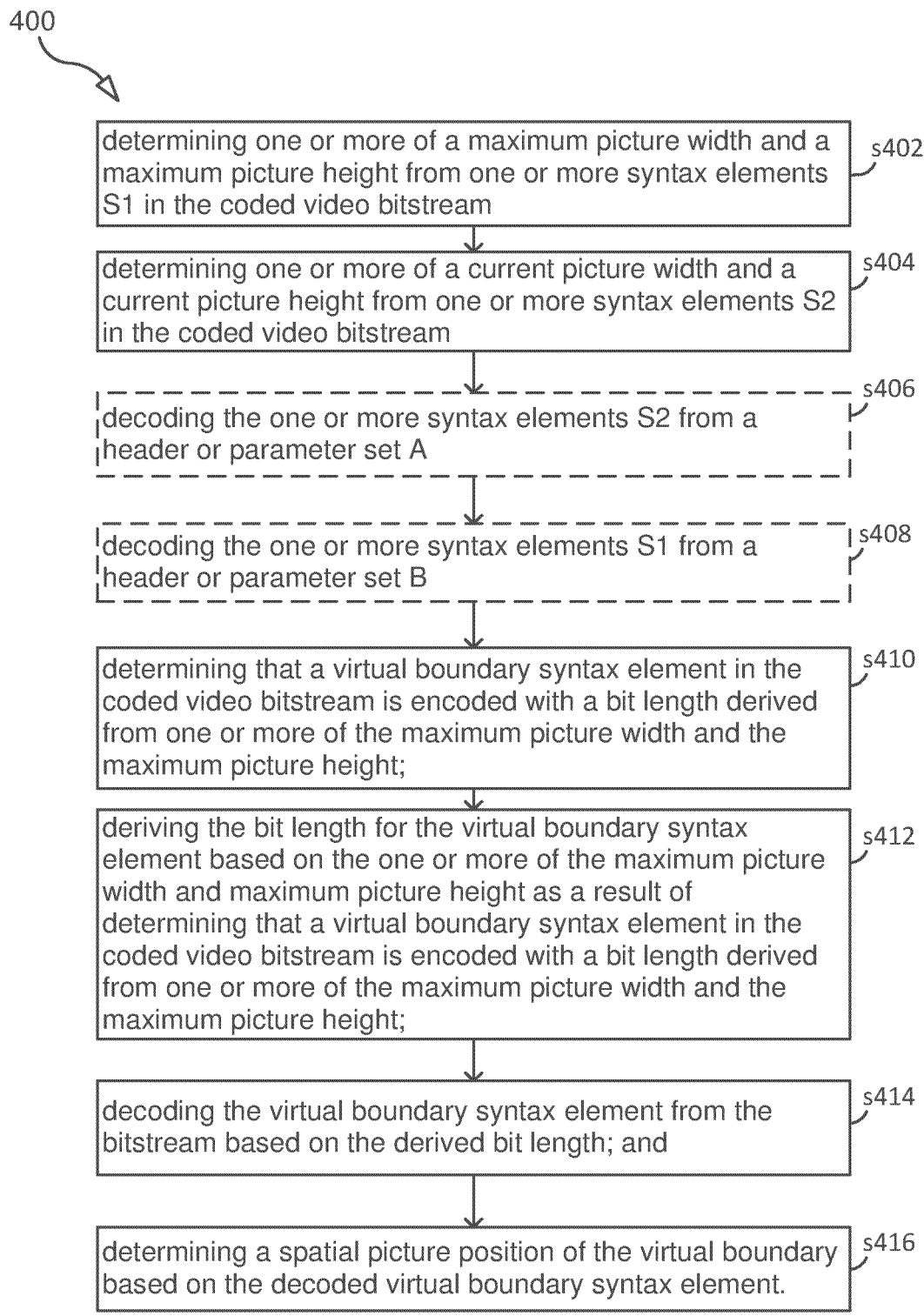
FIG. 4 is a flow chart of a decoding process according to an embodiment.
Figure 5:
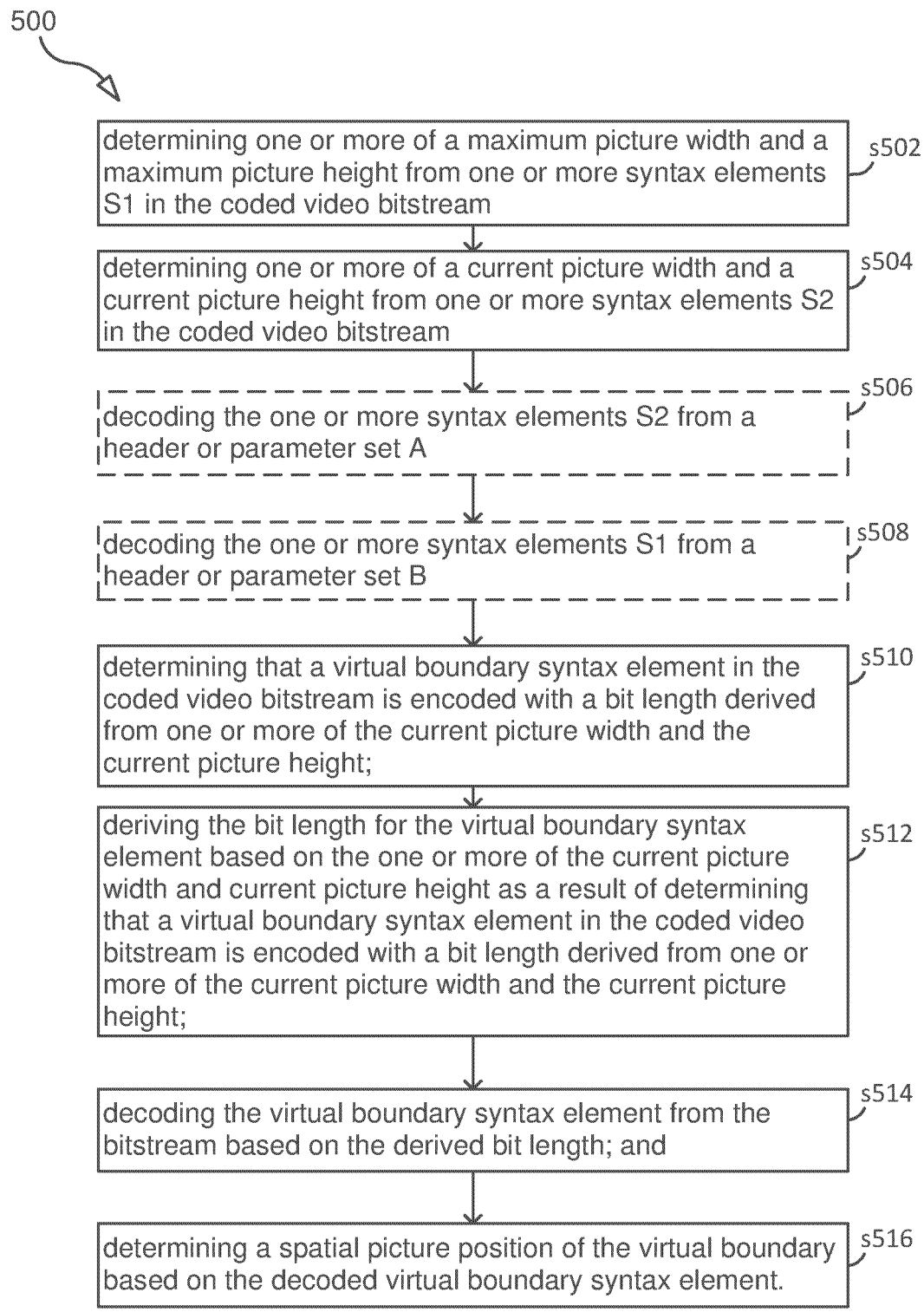
FIG. 5 is a flow chart of a decoding process according to an embodiment.

FIGS. 4 and 5 illustrate flow charts of decoding processes according to embodiments. Processes 400 and 500 are methods for decoding a picture comprising a virtual boundary from a coded video bitstream. As noted in the description of process 200 of FIG. 2, a decoding process (such as process 200) may include decoding one or more pictures from a coded video. Processes 400 and 500 are exemplary processes for decoding one or more pictures from a coded video. Process 400 may begin at step s402. Process 500 may begin at step s502.

Step s402 (and step s502) comprises determining one or more of a maximum picture width and a maximum picture height from one or more syntax elements S1 in the coded video bitstream.

Step s404 (and step s504) comprises determining one or more of a current picture width and a current picture height from one or more syntax elements S2 in the coded video bitstream.

Step s406 (and step s506) comprise optionally decoding the one or more syntax elements S2 from a header or parameter set A.

Step s408 (and step s508) comprise optionally decoding the one or more syntax elements S1 from a header or parameter set B.

Steps 410 and s510 involve determining whether the bit length is derived from the maximum picture width and/or height (step s410), or the current picture width and/or height (step s510). Specifically, step s410 comprises determining that a virtual boundary syntax element in the coded video bitstream is encoded with a bit length derived from one or more of a maximum picture width and a maximum picture height; and step s510 comprises determining that a virtual boundary syntax element in the coded video bitstream is encoded with a bit length derived from one or more of a current picture width and a current picture height.

Processes 400 and 500 are similar, differing in whether the bit length is derived from the maximum (process 400) or current (process 500) picture width and/or height. If the bit length is derived from the maximum picture width and/or height (as determined in step s410), then steps s412-s416 are performed. If the bit length is derived from the current picture width and/or height (as determined in step s510), then steps s512-s516 are performed. In embodiments, a decoding process determines whether the bit length is derived from the maximum picture width and/or height (step s410), or the current picture width and/or height (step s510) for a given picture, and then selects the appropriate steps to take (e.g., step s412 or step s512). That is, while decoding a sequence of pictures, a decoding process may perform the steps of process 400 for one picture in the sequence and the steps of process 500 for another picture in the sequence.

Step s412 comprises deriving a bit length for the virtual boundary syntax element based on the one or more of the maximum picture width and maximum picture height as a result of determining that a virtual boundary syntax element in the coded video bitstream is encoded with a bit length derived from one or more of a maximum picture width and a maximum picture height.

Step s512 comprises deriving a bit length for the virtual boundary syntax element based on the one or more of the current picture width and current picture height as a result of determining that a virtual boundary syntax element in the coded video bitstream is encoded with a bit length derived from one or more of a current picture width and a current picture height.

Step s414 (and step s514) comprises decoding the virtual boundary syntax element from the bitstream based on the derived bit length.

Step s416 (and step s516) comprises determining a spatial picture position (e.g., the x position) of the virtual boundary based on the decoded virtual boundary syntax element.

In some embodiments, determining whether the bit length is derived from the maximum picture width and/or height, or the current picture width and/or height, is based at least in part on whether a specific syntax element is signaled in the bitstream. For example, a syntax element representing a flag signaled in a header or parameter set C, that indicates the presence (or absence) of virtual boundaries in a given header or parameter set (e.g. header or parameter set A or B); or a syntax element representing a position of a virtual boundary in a given header or parameter set (e.g., header or parameter set C), may be used to determine, on the one hand, that the bit length is derived from the maximum picture width and/or height, and on the other hand, that the bit length is derived from the current picture width and/or height. For example, in some embodiments, if there is a flag indicating that virtual boundaries are present in the SPS, or if virtual boundary positions are signaled in the SPS, then it can be determined that the bit length is derived from the maximum picture width and/or height.

In some embodiments, while decoding the picture, process 400 and/or process 500 may further include disabling in-loop filtering across a virtual boundary edge (e.g., a horizontal or vertical edge) determined by the derived virtual boundary spatial picture position.

In some embodiments, the virtual boundary spatial picture position (e.g., x position) may be either a horizontal or a vertical position. Thus, the x position may be a y position. When the x position is a vertical position, the width is in effect a height.

In some embodiments, the bit length (at step s412) may be derived as equal to Ceil(Log 2(Ceil(maximum picture width÷N)−1)) bits, where N is a fixed value that may for instance be equal to 8. In some embodiments, the bit length (at step s512) may be derived as equal to Ceil(Log 2(Ceil (current picture width÷N)−1)) bits where N may for instance be equal to 8.

In some embodiments, the maximum picture width (or height) is not equal to the current picture width (or height), e.g. such that the lengths of syntax elements encoding the maximum and current picture width (or height) differ.

In some embodiments, header or parameter set A (or B or C) is one of a slice header, a picture header, a PPS, a SPS, a VPS, an APS, or a DCI. In some embodiments, header or parameter set C is the same as header or parameter set A; and in some embodiments, header or parameter set C is the same as header or parameter set B.

In some embodiments, determining a position (e.g., the x position) of the virtual boundary based on the decoded syntax elements may include determining both an x position and a y position of the virtual boundary. In some embodiments, both the current height and width, and the maximum height and width, are derived from separate syntax elements, and the virtual boundary positions for the x and y positions may be encoded in separate syntax elements, possibly having separate bit lengths.

In an embodiment, header or parameter set A is the picture parameter set associated with the picture being decoded; the first syntax element S1 is the current picture width and/or height associated with the parameter set A, header or parameter set B is the SPS that the picture refers to, and the second syntax element S2 is the maximum picture width and/or height signaled in that SPS. Additionally, in some embodiments, a one-bit flag in the SPS (sps_virtual_boundaries_present_flag) may indicate whether virtual boundaries are present in the SPS; if they are, then bit length is derived from the maximum picture width and/or height, and if they are not, then bit length is derived from the current picture width and/or height.

In some embodiments, a syntax element in the SPS that represents the x position of a virtual boundary (sps_virtual_boundaries_pos_x[i]) may represent the virtual boundary syntax element. In some embodiments, a syntax element in a PH or slice header that represents the x position of a virtual boundary ph_virtual_boundaries_pos_x[i] may represent the virtual boundary syntax element.

The following is an example of an embodiment, which modifies the current VVC specification.

|  | Descriptor |
|---|---|
| seq_parameter_set_rbsp( ) { | |
| ... | |
| pic_width_max_in_luma_samples | ue(v) |
| pic_height_max_in_luma_samples | ue(v) |
| ... | |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(v) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(v) |
|   } | |
| } | |
| ... | | pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).

When sps_video_parameter_set_id is greater than 0, it is a requirement of bitstream conformance that, for any OLS with OLS index i that contains one or more layers that refers to the SPS, the value of pic_width_max_in_luma_samples shall be less than or equal to the value of ols_dpb_pic_width[i].

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).

When sps_video_parameter_set_id is greater than 0, it is a requirement of bitstream conformance that, for any OLS with OLS index i that contains one or more layers that refers to the SPS, the value of pic_height_max_in_luma_samples shall be less than or equal to the value of ols_dpb_pic_height[i].

sps_virtual_boundaries_pos_x[i] specifies the location of the i-th vertical virtual boundary in units of luma samples divided by 8. The length of sps_virtual_boundaries_pos_x[i] is equal to Ceil(Log 2(Ceil(pic_width_max_in_luma_samples÷8)−1)) bits. The value of sps_virtual_boundaries_pos_x[i] shall be in the range of 1 to Ceil(pic_width_max_in_luma_samples÷8)−1, inclusive.

sps_virtual_boundaries_pos_y[i] specifies the location of the i-th horizontal virtual boundary in units of luma samples divided by 8. The length of sps_virtual_boundaries_pos_y[i] is equal to Ceil(Log 2(Ceil(pic_height_max_in_luma_samples÷8)−1)) bits. The value of sps_virtual_boundaries_pos_y[i] shall be in the range of 1 to Ceil(pic_height_max_in_luma_samples÷8)−1, inclusive.

|  | Descriptor |
|---|---|
| pic_parameter_set_rbsp( ) { | |
| ... | |
| pic_width_in_luma_samples | ue(v) |
| pic_height_in_luma_samples | ue(v) |
| ... | |
| } | | pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

| | Descriptor |
|---|---|
| picture_header_structure( ) { | |
| ... | |
|   if( sps_virtual_boundaries_enabled_flag && | |
| !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(v) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(v) |
|     } | |
| ... | | ph_virtual_boundaries_pos_x[i] specifies the location of the i-th vertical virtual boundary in units of luma samples divided by 8. The length of ph_virtual_boundaries_pos_x[i] is equal to Ceil(Log 2(Ceil(pic_width_in_luma_samples÷8)−1)) bits. The value of ph_virtual_boundaries_pos_x[i] shall be in the range of 1 to Ceil (pic_width_in_luma_samples÷8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

for($i$=0; $i$<NumVerVirtualBoundaries; $i$++)

VirtualBoundariesPosX[$i$]=(sps_virtual_boundaries_present_flag?sps_virtual_boundaries_pos_x[$i$]:ph_virtual_boundaries_pos_x[$i$])*8     (84)

The distance between any two vertical virtual boundaries shall be greater than or equal to CtbSizeY luma samples.

ph_virtual_boundaries_pos_y[i] specifies the location of the i-th horizontal virtual boundary in units of luma samples divided by 8. The length of ph_virtual_boundaries_pos_y[i] is equal to Ceil(Log 2(Ceil(pic_height_in_luma_samples÷8)−1)) bits. The value of ph_virtual_boundaries_pos_y[i] shall be in the range of 1 to Ceil(pic_height_in_luma_samples÷8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

for($i$=0; $i$<NumHorVirtualBoundaries; $i$++)

VirtualBoundariesPosY[$i$]=(sps_virtual_boundaries_present_flag?sps_virtual_boundaries_pos_y[$i$]:ph_virtual_boundaries_pos_y[$i$])*8     (86)

The distance between any two horizontal virtual boundaries shall be greater than or equal to CtbSizeY luma samples.

Figure 6:
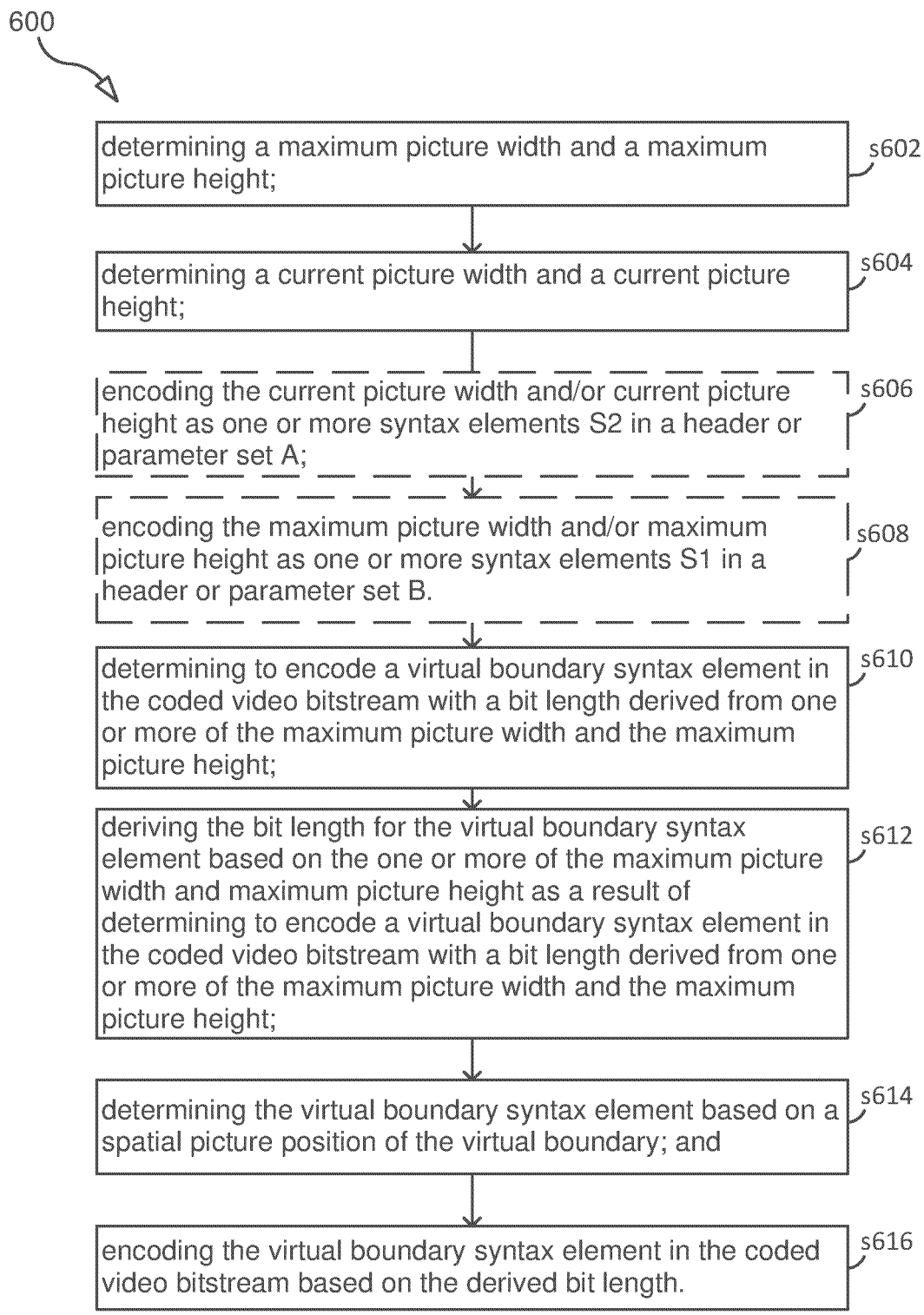
FIG. 6 is a flow chart of an encoding process according to an embodiment.
Figure 7:
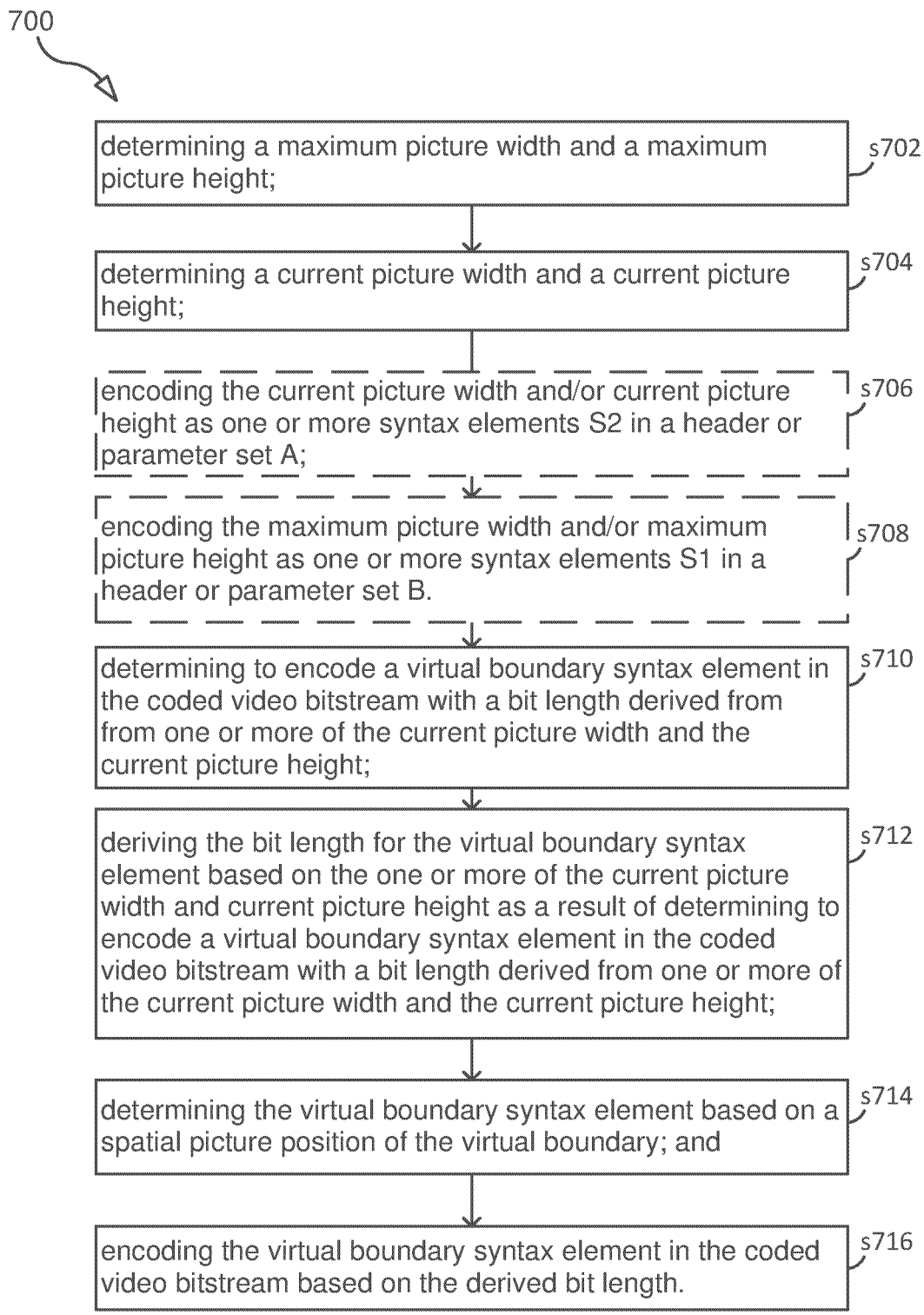
FIG. 7 is a flow chart of an encoding process according to an embodiment.

FIGS. 6 and 7 illustrate flow charts of encoding processes according to embodiments. Processes 600 and 700 are methods for encoding a picture comprising a virtual boundary to form a coded video bitstream. As noted in the description of process 300 of FIG. 3, an encoding process (such as process 300) may include encoding one or more pictures from a video. Processes 600 and 700 are exemplary processes for encoding one or more pictures from a video. Process 600 may begin at step s602. Process 700 may begin at step s702.

Step 602 (and step 702) comprises determining one or more of a maximum picture width and a maximum picture height.

Step s604 (and step s704) comprises determining one or more of a current picture width and a current picture height.

Step s606 (and step s706) comprises optionally encoding the current picture width and/or current picture height as one or more syntax elements S2 in a header or parameter set A.

Step s608 (and step s708) comprises optionally encoding the maximum picture width and/or maximum picture height as one or more syntax elements S1 in a header or parameter set B.

Steps 610 and s710 involve determining whether the bit length is derived from the maximum picture width and/or height (step s610), or the current picture width and/or height (step s710). Specifically, step s610 comprises determining to encode a virtual boundary syntax element in the coded video bitstream with a bit length derived from one or more of a maximum picture width and a maximum picture height; and step s710 comprises determining to encode a virtual boundary syntax element in the coded video bitstream with a bit length derived from one or more of a current picture width and a current picture height.

Processes 600 and 700 are similar, differing in whether the bit length is derived from the maximum (process 600) or current (process 700) picture width and/or height. If the bit length is derived from the maximum picture width and/or height (as determined in step s610), then steps s612-s616 are performed. If the bit length is derived from the current picture width and/or height (as determined in step s710), then steps s712-s716 are performed. In embodiments, an encoding process determines whether the bit length is derived from the maximum picture width and/or height (step s610), or the current picture width and/or height (step s710) for a given picture, and then selects the appropriate steps to take (e.g., step s612 or step s712). That is, while encoding a sequence of pictures, an encoding process may perform the steps of process 600 for one picture in the sequence and the steps of process 700 for another picture in the sequence.

Step s612 comprises deriving a bit length for the virtual boundary syntax element based on the one or more of the maximum picture width and maximum picture height as a result of determining to encode a virtual boundary syntax element in the coded video bitstream with a bit length derived from one or more of a maximum picture width and a maximum picture height.

Step s712 comprises deriving a bit length for the virtual boundary syntax element based on the one or more of the current picture width and current picture height as a result of determining to encode a virtual boundary syntax element in the coded video bitstream with a bit length derived from one or more of a current picture width and a current picture height.

Step s614 (and step s714) comprises determining the virtual boundary syntax element based on a spatial picture position of the virtual boundary.

Step s616 (and step s716) comprises encoding the virtual boundary syntax element in the coded video bitstream based on the derived bit length.

Figure 8:
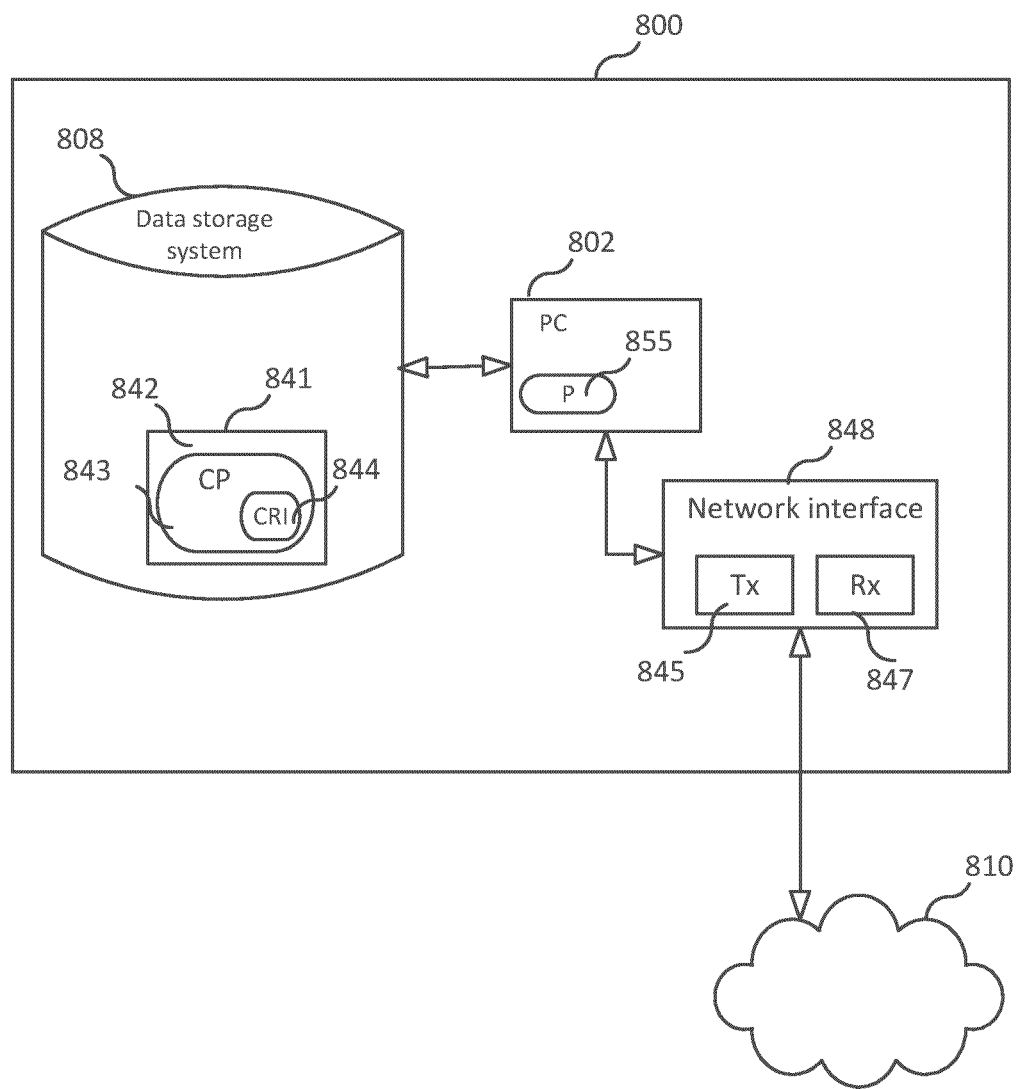
FIG. 8 is a block diagram of an apparatus according to an embodiment.

FIG. 8 is a block diagram of an apparatus 800 (e.g., a computing device such as an encoder and/or decoder), according to some embodiments. As shown in FIG. 8, the apparatus may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the apparatus to transmit data to and receive data from other nodes connected to a network 810 (e.g., an Internet Protocol (IP) network) to which network interface 848 is connected; and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the apparatus to perform steps described herein (e.g., steps described herein with reference to the flow charts). In other embodiments, the apparatus may be configured to perform steps described herein without the need for code. That is, for example, PC 802 may consist merely of one or more ASICs. Hence, the features of the embodiments described herein may be implemented in hardware and/or software.

Figure 9:
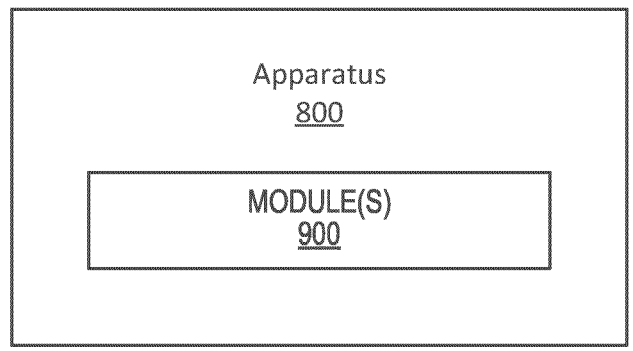
FIG. 9 is a block diagram of an apparatus according to an embodiment.

FIG. 9 is a schematic block diagram of the apparatus 800 according to some other embodiments. The apparatus 800 includes one or more modules 900, each of which is implemented in software. The module(s) 900 provide the functionality of apparatus 800 described herein (e.g., the steps herein, e.g., with respect to FIGS. 2-7).

SUMMARY OF VARIOUS EMBODIMENTS

A1. A method for decoding a picture comprising a virtual boundary from a coded video bitstream, the method comprising: determining one or more of a maximum picture width and a maximum picture height from one or more syntax elements S1 in the coded video bitstream; determining one or more of a current picture width and a current picture height from one or more syntax elements S2 in the coded video bitstream; determining that a virtual boundary syntax element in the coded video bitstream is encoded with a bit length derived from one or more of the maximum picture width and the maximum picture height; deriving the bit length for the virtual boundary syntax element based on the one or more of the maximum picture width and maximum picture height as a result of determining that a virtual boundary syntax element in the coded video bitstream is encoded with a bit length derived from one or more of the maximum picture width and the maximum picture height; decoding the virtual boundary syntax element from the bitstream based on the derived bit length; and determining a spatial picture position of the virtual boundary based on the decoded virtual boundary syntax element.

A1a. The method of embodiment A1a, wherein decoding the virtual boundary syntax element from the bitstream based on the derived bit length comprises reading N bits from the coded video bitstream, wherein N is equal to the derived bit length for the virtual boundary syntax element.

A1b. The method of any one of embodiments A1 and A1a, further comprising decoding the picture based on the spatial picture position of the virtual boundary.

A2. The method of any one of embodiment A1, A1a, and A1b, wherein the current picture width is not equal to the maximum picture width.

A3. The method of any one of embodiments A1-A2, wherein the current picture height is not equal to the maximum picture height.

A4. The method of any one of embodiments A1-A3, further comprising: decoding the one or more syntax elements S2 from a header or parameter set A; decoding the one or more syntax elements S1 from a header or parameter set B.

A5. The method of embodiment A4, wherein determining that a virtual boundary syntax element in the coded video bitstream is encoded with a bit length derived from one or more of a maximum picture width and a maximum picture height comprises determining that the virtual boundary syntax element is part of one of the header or parameter set A or the header or parameter set B.

A6. The method of embodiment A5, wherein the one of the header or parameter set A or the header or parameter set B that the virtual boundary syntax element is part of comprises a sequence parameter set (SPS) associated with the picture being decoded.

A6a. The method of embodiment A5, wherein the one of the header or parameter set A or the header or parameter set B that the virtual boundary syntax element is part of comprises a picture header (PH) associated with the picture being decoded.

A7. The method of any one of embodiments A5-A6a, wherein determining that the virtual boundary syntax element is part of one of the header or parameter set A or the header or parameter set B comprises: decoding a flag from a header or parameter set C indicating the presence of one or more virtual boundaries; and determining that the value of the flag is equal to a value specifying that one or more virtual boundaries are present.

A8. The method of any one of embodiments A1-A7, wherein deriving a bit length for the virtual boundary syntax element based on the one or more of the maximum picture width and maximum picture height comprises calculating the equation Ceil(Log 2(Ceil(X÷N)−1)), where X refers to one of the maximum picture width and maximum picture height and N is a fixed value, and where Ceil represents the ceiling function and Log 2 represents the base-2 logarithm.

A9. The method of embodiment A8, wherein N=8.

A10. The method of embodiment A7, wherein the header or parameter set C is the same as the header or parameter set A.

A11. The method of embodiment A7, wherein the header or parameter set C is the same as the header or parameter set B.

A12. The method of any one of embodiments A4-A11, wherein the header or parameter set A is one of a slice header, a picture header, a picture parameter set (PPS), a sequence parameter set (SPS), a video parameter set (VPS), an adaptive parameter set (APS), and a decoding capability information (DCI).

A13. The method of any one of embodiments A4-A12, wherein the header or parameter set B is one of a slice header, a picture header, a picture parameter set (PPS), a sequence parameter set (SPS), a video parameter set (VPS), an adaptive parameter set (APS), and a decoding capability information (DCI).

A14. The method of any one of embodiments A1-A13, wherein the determined spatial picture position of the virtual boundary is one of a horizontal position and a vertical position.

A15. The method of any one of embodiments A1-A14, further comprising: disabling in-loop filtering across an edge of the virtual boundary based on the determined spatial picture position of the virtual boundary during decoding of the picture.

B1. A method for decoding a picture comprising a virtual boundary from a coded video bitstream, the method comprising: determining one or more of a maximum picture width and a maximum picture height from one or more syntax elements S1 in the coded video bitstream; determining one or more of a current picture width and a current picture height from one or more syntax elements S2 in the coded video bitstream; determining that a virtual boundary syntax element in the coded video bitstream is encoded with a bit length derived from one or more of the current picture width and the current picture height; deriving the bit length for the virtual boundary syntax element based on the one or more of the current picture width and current picture height as a result of determining that a virtual boundary syntax element in the coded video bitstream is derived from one or more of the current picture width and the current picture height; decoding the virtual boundary syntax element from the bitstream based on the derived bit length; and determining a spatial picture position of the virtual boundary based on the decoded virtual boundary syntax element.

B2. The method of embodiment B1, wherein the current picture width is not equal to the maximum picture width.

B3. The method of any one of embodiments B1-B2, wherein the current picture height is not equal to the maximum picture height B4. The method of any one of embodiments A1-A3, further comprising: decoding the one or more syntax elements S2 from a header or parameter set A; decoding the one or more syntax elements S1 from a header or parameter set B.

B5. The method of embodiment B4, wherein determining that a virtual boundary syntax element in the coded video bitstream is encoded with a bit length derived from one or more of a current picture width and a current picture height comprises determining that the virtual boundary syntax element is part of one of the header or parameter set A or the header or parameter set B.

B6. The method of embodiment B5, wherein the one of the header or parameter set A or the header or parameter set B that the virtual boundary syntax element is part of comprises a sequence parameter set (SPS) associated with the picture being decoded.

B6a. The method of embodiment B5, wherein the one of the header or parameter set A or the header or parameter set B that the virtual boundary syntax element is part of comprises a picture header (PH) associated with the picture being decoded.

B7. The method of any one of embodiments B5-B6a, wherein determining that the virtual boundary syntax element is part of the one of the header or parameter set A or the header or parameter set B comprises: decoding a flag from a header or parameter set C indicating the presence of one or more virtual boundaries; and determining that the value of the flag is equal to a value specifying that virtual boundaries are not present.

B8. The method according to embodiment B7, wherein the virtual boundary syntax element is decoded from the header or parameter set C.

B9. The method of any one of embodiments B1-B8, wherein deriving a bit length for the virtual boundary syntax element based on the one or more of the current picture width and current picture height comprises calculating the equation Ceil(Log 2(Ceil(X÷N)−1)), where X refers to one of the current picture width and current picture height and N is a fixed value, and where Ceil represents the ceiling function and Log 2 represents the base-2 logarithm.

B10. The method of embodiment B9, wherein N=8.

B11. The method of any one of embodiments B7-B8, wherein the header or parameter set C is the same as the header or parameter set A.

B12. The method of any one of embodiments B7-B8, wherein the header or parameter set C is the same as the header or parameter set B.

B13. The method of any one of embodiments B4-B12, wherein the header or parameter set A is one of a slice header, a picture header, a picture parameter set (PPS), a sequence parameter set (SPS), a video parameter set (VPS), an adaptive parameter set (APS), and a decoding capability information (DCI).

B14. The method according to any one of embodiments B4-B13, wherein the header or parameter set B is one of a slice header, a picture header, a picture parameter set (PPS), a sequence parameter set (SPS), a video parameter set (VPS), an adaptive parameter set (APS), and a decoding capability information (DCI).

B15. The method according to any one of embodiments B1-B14, wherein the determined spatial picture position of the virtual boundary is one of a horizontal position and a vertical position.

B16. The method according to any one of embodiments B1-B15, further comprising: disabling in-loop filtering across a virtual boundary edge based on the determined spatial picture position of the virtual boundary during decoding of the picture.

C1. A computing device for decoding a picture comprising a virtual boundary from a coded video bitstream, the computing device comprising processing circuitry and a memory containing instructions executable by the processing circuitry, whereby the processing circuitry is operable to: determine one or more of a maximum picture width and a maximum picture height from one or more syntax elements S1 in the coded video bitstream; determine one or more of a current picture width and a current picture height from one or more syntax elements S2 in the coded video bitstream; determine that a virtual boundary syntax element in the coded video bitstream is encoded with a bit length derived from one or more of the maximum picture width and the maximum picture height; derive the bit length for the virtual boundary syntax element based on the one or more of the maximum picture width and maximum picture height as a result of determining that a virtual boundary syntax element in the coded video bitstream is encoded with a bit length derived from one or more of the maximum picture width and the maximum picture height; decode the virtual boundary syntax element from the bitstream based on the derived bit length; and determine a spatial picture position of the virtual boundary based on the decoded virtual boundary syntax element.

C2. The computing device of embodiment C1, whereby the processing circuitry is further operable to perform any one of embodiments A2-A15.

D1. A computing device for decoding a picture comprising a virtual boundary from a coded video bitstream, the computing device comprising processing circuitry and a memory containing instructions executable by the processing circuitry, whereby the processing circuitry is operable to: determine one or more of a maximum picture width and a maximum picture height from one or more syntax elements S1 in the coded video bitstream; determine one or more of a current picture width and a current picture height from one or more syntax elements S2 in the coded video bitstream; determine that a virtual boundary syntax element in the coded video bitstream is encoded with a bit length derived from one or more of the current picture width and the current picture height; derive the bit length for the virtual boundary syntax element based on the one or more of the current picture width and current picture height as a result of determining that a virtual boundary syntax element in the coded video bitstream is derived from one or more of a current picture width and a current picture height; decode the virtual boundary syntax element from the bitstream based on the derived bit length; and determine a spatial picture position of the virtual boundary based on the decoded virtual boundary syntax element.

D2. The computing device of embodiment D1, whereby the processing circuitry is further operable to perform any one of embodiments B2-B16.

E1. A computing device for decoding a picture comprising a virtual boundary from a coded video bitstream, the computing device comprising processing circuitry and a memory containing instructions executable by the processing circuitry, whereby the processing circuitry is operable to: determine one or more of a maximum picture width and a maximum picture height from one or more syntax elements S1 in the coded video bitstream; determine one or more of a current picture width and a current picture height from one or more syntax elements S2 in the coded video bitstream; determine whether a virtual boundary syntax element in the coded video bitstream is encoded with a bit length derived from (i) one or more of the maximum picture width and the maximum picture height or (ii) one or more of the current picture width and the current picture height; derive the bit length for the virtual boundary syntax element; decode the virtual boundary syntax element from the bitstream based on the derived bit length; and determine a spatial picture position of the virtual boundary based on the decoded virtual boundary syntax element, wherein if it is determined that the virtual boundary syntax element in the coded video bitstream is encoded with a bit length derived from one or more of a maximum picture width and a maximum picture height, the bit length for the virtual boundary syntax element is derived based on the one or more of the maximum picture width and maximum picture height, and if it is determined that the virtual boundary syntax element in the coded video bitstream is encoded with a bit length derived from one or more of a current picture width and a current picture height, the bit length for the virtual boundary syntax element is derived based on the one or more of the current picture width and current picture height.

E2. The computing device of embodiment E1, whereby the processing circuitry is further operable to perform any one of embodiments A2-A15 and B2-B16.

F1. A method for encoding a picture comprising a virtual boundary to form a coded video bitstream, the method comprising: determining one or more of a maximum picture width and a maximum picture height; determining one or more of a current picture width and a current picture height; determining to encode a virtual boundary syntax element in the coded video bitstream with a bit length derived from one or more of the maximum picture width and the maximum picture height; deriving the bit length for the virtual boundary syntax element based on the one or more of the maximum picture width and maximum picture height as a result of determining to encode a virtual boundary syntax element in the coded video bitstream with a bit length derived from one or more of the maximum picture width and the maximum picture height; determining the virtual boundary syntax element based on a spatial picture position of the virtual boundary; and encoding the virtual boundary syntax element in the coded video bitstream based on the derived bit length.

F2 The method of embodiment F1, wherein the current picture width is not equal to the maximum picture width.

F3 The method of any one of embodiments F1-F2, wherein the current picture height is not equal to the maximum picture height F4. The method of any one of embodiments F1-F3, further comprising: encoding the current picture width and/or current picture height as one or more syntax elements S2 in a header or parameter set A; encoding the maximum picture width and/or maximum picture height as one or more syntax elements S1 in a header or parameter set B.

F5. The method of embodiment F4, wherein determining to encode a virtual boundary syntax element in the coded video bitstream with a bit length derived from one or more of a maximum picture width and a maximum picture height comprises determining that the virtual boundary syntax element is to be encoded as part of one of the header or parameter set A or the header or parameter set B.

F6. The method of embodiment F5, wherein the one of the header or parameter set A or the header or parameter set B comprises a sequence parameter set (SPS) associated with the picture being encoded.

F7. The method of any one of embodiments F5-F6, wherein determining that the virtual boundary syntax element is to be encoded as part of one of the header or parameter set A or the header or parameter set B comprises: determining a value for a flag in a header or parameter set C, wherein the value specifies that one or more virtual boundaries are present; and encoding the flag with the value as part of encoding the header or parameter set C.

F8. The method of any one of embodiments F1-F7, wherein deriving a bit length for the virtual boundary syntax element based on the one or more of the maximum picture width and maximum picture height comprises calculating the equation Ceil(Log 2(Ceil(X÷N)−1)), where X refers to one of the maximum picture width and maximum picture height and N is a fixed value, and where Ceil represents the ceiling function and Log 2 represents the base-2 logarithm.

F9. The method of embodiment F8, wherein N=8.

F10. The method of embodiment F7, wherein the header or parameter set C is the same as the header or parameter set A.

F11. The method of embodiment F7, wherein the header or parameter set C is the same as the header or parameter set B.

F12. The method of any one of embodiments F4-F11, wherein the header or parameter set A is one of a slice header, a picture header, a picture parameter set (PPS), a sequence parameter set (SPS), a video parameter set (VPS), an adaptive parameter set (APS), and a decoding capability information (DCI).

F13. The method of any one of embodiments F4-F12, wherein the header or parameter set B is one of a slice header, a picture header, a picture parameter set (PPS), a sequence parameter set (SPS), a video parameter set (VPS), an adaptive parameter set (APS), and a decoding capability information (DCI).

F14. The method of any one of embodiments F1-F13, wherein the spatial picture position of the virtual boundary is one of a horizontal position and a vertical position.

G1. A method for encoding a picture comprising a virtual boundary to form a coded video bitstream, the method comprising: determining one or more of a maximum picture width and a maximum picture height; determining one or more of a current picture width and a current picture height; determining to encode a virtual boundary syntax element in the coded video bitstream with a bit length derived from one or more of the current picture width and the current picture height; deriving the bit length for the virtual boundary syntax element based on the one or more of the current picture width and current picture height as a result of determining to encode a virtual boundary syntax element in the coded video bitstream with a bit length derived from one or more of a current picture width and a current picture height; determining the virtual boundary syntax element based on a spatial picture position of the virtual boundary; and encoding the virtual boundary syntax element in the coded video bitstream based on the derived bit length.

G2. The method of embodiment G1, wherein the current picture width is not equal to the maximum picture width.

G3. The method of any one of embodiments G1-G2, wherein the current picture height is not equal to the maximum picture height G4. The method of any one of embodiments G1-G3, further comprising: encoding the current picture width and/or current picture height as one or more syntax elements S2 in a header or parameter set A; encoding the maximum picture width and/or maximum picture height as one or more syntax elements S1 in a header or parameter set B.

G5. The method of embodiment G4, wherein determining to encode a virtual boundary syntax element in the coded video bitstream with a bit length derived from one or more of a current picture width and a current picture height comprises determining that the virtual boundary syntax element is to be encoded as part of one of the header or parameter set A or the header or parameter set B.

G6. The method of embodiment G5, wherein the one of the header or parameter set A or the header or parameter set B comprises a sequence parameter set (SPS) associated with the picture being encoded.

G7. The method of any one of embodiments G5-G6, wherein determining that the virtual boundary syntax element is to be encoded as part of the one of the header or parameter set A or the header or parameter set B comprises: determining a value for a flag in a header or parameter set C, wherein the value specifies that virtual boundaries are not present; and encoding the flag with the value as part of encoding the header or parameter set C.

G8. The method according to embodiment G7, wherein the virtual boundary syntax element is encoded in the header or parameter set C.

G9. The method of any one of embodiments G1-G8, wherein deriving a bit length for the virtual boundary syntax element based on the one or more of the current picture width and current picture height comprises calculating the equation Ceil(Log 2(Ceil(X÷N)−1)), where X refers to one of the current picture width and current picture height and N is a fixed value, and where Ceil represents the ceiling function and Log 2 represents the base-2 logarithm.

G10. The method of embodiment G9, wherein N=8.

G11. The method of any one of embodiments G7-G8, wherein the header or parameter set C is the same as the header or parameter set A.

G12. The method of any one of embodiments G7-G8, wherein the header or parameter set C is the same as the header or parameter set B.

G13. The method of any one of embodiments G4-G12, wherein the header or parameter set A is one of a slice header, a picture header, a picture parameter set (PPS), a sequence parameter set (SPS), a video parameter set (VPS), an adaptive parameter set (APS), and a decoding capability information (DCI).

G14. The method according to any one of embodiments G4-G13, wherein the header or parameter set B is one of a slice header, a picture header, a picture parameter set (PPS), a sequence parameter set (SPS), a video parameter set (VPS), an adaptive parameter set (APS), and a decoding capability information (DCI).

G15. The method according to any one of embodiments G1-G14, wherein the spatial picture position of the virtual boundary is one of a horizontal position and a vertical position.

H1. A computing device for encoding a picture comprising a virtual boundary to form a coded video bitstream, the computing device comprising processing circuitry and a memory containing instructions executable by the processing circuitry, whereby the processing circuitry is operable to: determine one or more of a maximum picture width and a maximum picture height; determine one or more of a current picture width and a current picture height; determine to encode a virtual boundary syntax element in the coded video bitstream with a bit length derived from one or more of the maximum picture width and the maximum picture height; derive the bit length for the virtual boundary syntax element based on the one or more of the maximum picture width and maximum picture height as a result of determining to encode a virtual boundary syntax element in the coded video bitstream with a bit length derived from one or more of the maximum picture width and the maximum picture height; determine the virtual boundary syntax element based on a spatial picture position of the virtual boundary; and encode the virtual boundary syntax element in the coded video bitstream based on the derived bit length.

H2. The computing device of embodiment H1, whereby the processing circuitry is further operable to perform any one of embodiments F2-F14.

I1. A computing device for encoding a picture comprising a virtual boundary to form a coded video bitstream, the computing device comprising processing circuitry and a memory containing instructions executable by the processing circuitry, whereby the processing circuitry is operable to: determine one or more of a maximum picture width and a maximum picture height; determine one or more of a current picture width and a current picture height; determine to encode a virtual boundary syntax element in the coded video bitstream with a bit length derived from one or more of the current picture width and the current picture height; derive the bit length for the virtual boundary syntax element based on the one or more of the current picture width and current picture height as a result of determining to encode a virtual boundary syntax element in the coded video bitstream with a bit length derived from one or more of the current picture width and the current picture height; determine the virtual boundary syntax element based on a position of the virtual boundary; and encode the virtual boundary syntax element in the coded video bitstream based on the derived bit length.

I2. The computing device of embodiment I1, whereby the processing circuitry is further operable to perform any one of embodiments G2-G15.

J1. A computing device for encoding a picture comprising a virtual boundary to form a coded video bitstream, the computing device comprising processing circuitry and a memory containing instructions executable by the processing circuitry, whereby the processing circuitry is operable to: determine one or more of a maximum picture width and a maximum picture height; determine one or more of a current picture width and a current picture height; determine whether to encode a virtual boundary syntax element in the coded video bitstream with a bit length derived from (i) one or more of the maximum picture width and the maximum picture height or (ii) one or more of the current picture width and the current picture height; derive the bit length for the virtual boundary syntax element; determine a virtual boundary syntax element based on a position of the virtual boundary; encode the virtual boundary syntax element in the bitstream based on the derived bit length, wherein if it is determined to encode the virtual boundary syntax element in the coded video bitstream with a bit length derived from one or more of a maximum picture width and a maximum picture height, the bit length for the virtual boundary syntax element is derived based on the one or more of the maximum picture width and maximum picture height, and if it is determined to encode the virtual boundary syntax element in the coded video bitstream with a bit length derived from one or more of a current picture width and a current picture height, the bit length for the virtual boundary syntax element is derived based on the one or more of the current picture width and current picture height.

J2. The computing device of embodiment J1, whereby the processing circuitry is further operable to perform any one of embodiments F2-F14 and G2-G15.

K1. A computer program comprising instructions which when executed by processing circuitry causes the processing circuitry to perform the method of any one of embodiments F1-F14 and G1-G15.

K2. A carrier containing the computer program of embodiment K1, wherein the carrier is one of an electronic signal, an optical signal, a radio signal, and a computer readable storage medium.

Figure 10:
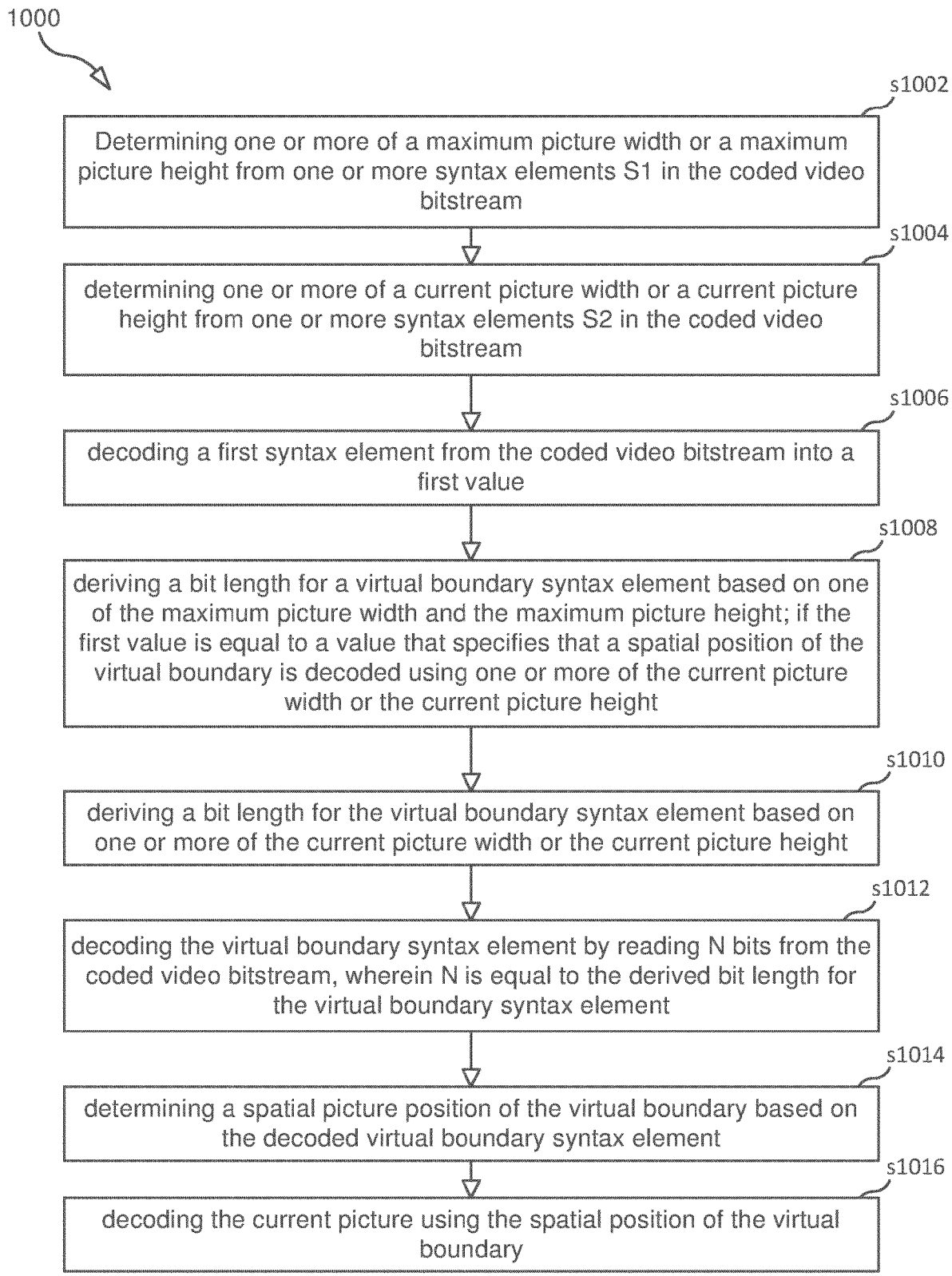
FIG. 10 is a flow chart of a decoding process according to an embodiment.

L1. A method 1000 (see FIG. 10) for decoding a current picture comprising a virtual boundary from a coded video bitstream, the method comprising: determining s1002 one or more of a maximum picture width or a maximum picture height from one or more syntax elements S1 in the coded video bitstream; determining s1004 one or more of a current picture width or a current picture height from one or more syntax elements S2 in the coded video bitstream; decoding s1006 a first syntax element from the coded video bitstream into a first value, wherein the first value specifies whether a spatial position of the virtual boundary is decoded using one or more of the maximum picture width or the maximum picture height, or one or more of the current picture width or the current picture height; if the first value is equal to a value that specifies that a spatial position of the virtual boundary is decoded using one or more of the maximum picture width or the maximum picture height; deriving s1008 a bit length for a virtual boundary syntax element based on one of the maximum picture width and the maximum picture height; if the first value is equal to a value that specifies that a spatial position of the virtual boundary is decoded using one or more of the current picture width or the current picture height; deriving s1010 a bit length for the virtual boundary syntax element based on one or more of the current picture width or the current picture height; decoding s1012 the virtual boundary syntax element by reading N bits from the coded video bitstream, wherein N is equal to the derived bit length for the virtual boundary syntax element; determining s1014 a spatial picture position of the virtual boundary based on the decoded virtual boundary syntax element; and decoding s1016 the current picture using the spatial position of the virtual boundary.

L2. The method of embodiment L1, wherein the current picture width is not equal to the maximum picture width.

L3. The method of any one of embodiments L1-L2, wherein the current picture height is not equal to the maximum picture height.

L4. The method of any one of embodiments L1-L3, further comprising: in response to determining that the first value is equal to a value that specifies that a spatial position of the virtual boundary is decoded using one or more of the maximum picture width and the maximum picture height, decoding the virtual boundary syntax element from a sequence parameter set; and in response to determining that the first value is equal to a value that specifies that a spatial position of the virtual boundary is decoded using one or more of the current picture width and the current picture height, decoding the virtual boundary syntax element from a picture parameter set.

L5. The method of any one of embodiments L1-L4, further comprising decoding the first syntax element from a sequence parameter set.

Additional Description

This disclosure proposes constraining the virtual boundaries to be signaled strictly in left to right and top to bottom order for VVC. There is currently no ordering constraints for the virtual boundaries in the VVC specification and arbitrary order therefore is allowed. There is no benefit from allowing arbitrary order and that a cleaner design would be to enforce an order from lower values to higher.

This disclosure further proposes to change the signaling from u(13) to u(v) with the length depending on the picture width and height. The proponents claim that u(v) was originally used for virtual boundary signaling but that this was changed to u(13) in Gothenburg.

Proposal 1, Adding Constraints:

Constrain the virtual boundary syntax elements to be signaled in order from left to right for vertical virtual boundaries and from top to bottom for horizontal virtual boundaries.

Proposal 2, Alternative Signaling:

Change the signaling of the virtual boundaries from u(13) to u(v) in SPS and PH, where v is derived from the maximum picture size for syntax elements in the SPS and derived from the picture size for syntax elements in the PH.

Proposals 1 and 2 are independent.

Introduction/Problem Statement

Virtual boundaries in the current VVC specification are signaled in the SPS and PH using the following syntax and semantics:

| | Descriptor |
|---|---|
| seq_parameter_set_rbsp( ) { | |
| ... | |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| ... | | sps_virtual_boundaries_enabled_flag equal to 1 specifies that disabling in-loop filtering across virtual boundaries may be applied in the coded pictures in the CLVS.
sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations.

-continued

| | Descriptor |
|---|---|
| sps_virtual_boundaries_present_flag equal to 1 specifies that information of virtual boundaries is signaled in the SPS. sps_virtual_boundaries_present_flag equal to 0 specifies that information of virtual boundaries is not signaled in the SPS. When there is one or more than one virtual boundaries signaled in the SPS, the in-loop filtering operations are disabled across the virtual boundaries in pictures referring to the SPS. In-loop filtering operations include the deblocking filter, sample adaptive offset filter, and adaptive loop filter operations. It is a requirement of bitstream conformance that when the value of res_change_in_clvs_allowed_flag is equal to 1, the value of sps_virtual_boundaries_present_flag shall be equal to 0. sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0. sps_virtual_boundaries_pos_x[ i ] specifies the location of the i-th vertical virtual boundary in units of luma samples divided by 8. The value of sps_virtual_boundaries_pos_x[ i ] shall be in the range of 1 to Ceil( pic_width_max_in_luma_samples ÷ 8 ) − 1, inclusive. sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0. When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0. sps_virtual_boundaries_pos_y[ i ] specifies the location of the i-th horizontal virtual boundary in units of luma samples divided by 8. The value of sps_virtual_boundaries_pos_y[ i ] shall be in the range of 1 to Ceil( pic_height_max_in_luma_samples ÷ 8 ) − 1, inclusive. | |

| | Descriptor |
|---|---|
| picture_header_structure( ) { <br> ... <br> if( sps_virtual_boundaries_enabled_flag && !sps_virtual_boundaries_present_flag ) { <br>   ph_virtual_boundaries_present_flag <br>   if( ph_virtual_boundaries_present_flag ) { <br>     ph_num_ver_virtual_boundaries <br>     for( i = 0; i < ph_num_ver_virtual_boundaries; i++ ) <br>       ph_virtual_boundaries_pos_x[ i ] <br>     ph_num_hor_virtual_boundaries <br>     for( i = 0; i < ph_num_hor_virtual_boundaries; i++ ) <br>       ph_virtual_boundaries_pos_y[ i ] <br>   } <br> } <br> ... <br> } | <br><br><br><br>u(1)<br><br>u(2)<br><br><br>u(13)<br>u(2)<br><br><br>u(13) |
| ph_virtual_boundaries_present_flag equal to 1 specifies that information of virtual boundaries is signaled in the PH. ph_virtual_boundaries_present_flag equal to 0 specifies that information of virtual boundaries is not signaled in the PH. When there is one or more than one virtual boundaries signaled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0. It is a requirement of bitstream conformance that, when subpic_info_present_flag is equal to 1, the value of ph_virtual_boundaries_present_flag shall be equal to 0. The variable VirtualBoundariesPresentFlag is derived as follows: <br>   VirtualBoundariesPresentFlag = 0 <br>   if( sps_virtual_boundaries_enabled_flag ) <br>     VirtualBoundariesPresentFlag = <br>       sps_virtual_boundaries_present_flag | | <br>         ph_virtual_boundaries_present_flag <br>     (82) | |

| | Descriptor |
|---|---|
| ph_num_ver_virtual_boundaries specifies the number of ph_virtual_boundaries_pos_x[ i ] syntax elements that are present in the PH. When ph_num_ver_virtual_boundaries is not present, it is inferred to be equal to 0. The variable NumVerVirtualBoundaries is derived as follows: <br>   NumVerVirtualBoundaries = 0 <br>   if( sps_virtual_boundaries_enabled_flag ) <br>     NumVerVirtualBoundaries = <br>       sps_virtual_boundaries_present_flag ? <br>         sps_num_ver_virtual_boundaries : <br>         ph_num_ver_virtual_boundaries   (83) <br> ph_virtual_boundaries_pos_x[ i ] specifies the location of the i-th vertical virtual boundary in units of luma samples divided by 8. The value of ph_virtual_boundaries_pos_x[ i ] shall be in the range of 1 to Ceil( pic_width_in_luma_samples ÷ 8 ) − 1, inclusive. The list VirtualBoundariesPosX[ i ] for i ranging from 0 to NumVerVirtualBoundaries − 1, inclusive, in units of luma samples, specifying the locations of the vertical virtual boundaries, is derived as follows: <br>   for( i = 0; i < NumVerVirtualBoundaries; i++) <br>     VirtualBoundariesPosX[ i ] = ( <br>       sps_virtual_boundaries_present flag ? <br>         sps_virtual_boundaries_pos_x[ i ] : <br>         ph_virtual_boundaries_pos_x[ i ] ) * 8 <br>     (84) <br> The distance between any two vertical virtual boundaries shall be greater than or equal to CtbSizeY luma samples. ph_num_hor_virtual_boundaries specifies the number of ph_virtual_boundaries_pos_y[ i ] syntax elements that are present in the PH. When ph_num_hor_virtual_boundaries is not present, it is inferred to be equal to 0. The parameter NumHorVirtualBoundaries is derived as follows: <br>   NumHorVirtualBoundaries = 0 <br>   if( sps_virtual_boundaries_enabled_flag ) <br>     NumHorVirtualBoundaries = <br>       sps_virtual_boundaries_present_flag ? <br>         sps_num_hor_virtual_boundaries : <br>         ph_num_hor_virtual_boundaries   (85) <br> When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0. ph_virtual_boundaries_pos_y[ i ] specifies the location of the i-th horizontal virtual boundary in units of luma samples divided by 8. The value of ph_virtual_boundaries_pos_y[ i ] shall be in the range of 1 to Ceil( pic_height_in_luma_samples ÷ 8 ) − 1, inclusive. The list VirtualBoundariesPosY[ i ] for i ranging from 0 to NumHorVirtualBoundaries − 1, inclusive, in units of luma samples, specifying the locations of the horizontal virtual boundaries, is derived as follows: <br>   for( i = 0; i < NumHorVirtualBoundaries; i++) <br>     VirtualBoundariesPosY[ i ] = ( <br>       sps_virtual_boundaries_present_flag ? <br>         sps_virtual_boundaries_pos_y[ i ] : <br>         ph_virtual_boundaries_pos_y[ i ] ) * 8 <br>     (86) <br> The distance between any two horizontal virtual boundaries shall be greater than or equal to CtbSizeY luma samples. | |

There is currently no order stated for the virtual boundaries in the VVC specification. Hence arbitrary order is allowed while there is no benefit from the arbitrary order. A cleaner design would be an ordered design. Moreover, order is useful for obtaining the relative position of the virtual boundaries e.g. the first vertical virtual boundary is to the left of the second vertical virtual boundary. As another advantage, it is possible to exploit the knowledge about the fixed order for more efficient signaling of the positions of the virtual boundaries or to simplify checks to find out if a sample point is located on or vicinity of a virtual boundary.

Previously, when it was decided to go for u(13) signaling for the virtual boundary positions (during the O-meeting in Gothenburg), the virtual boundaries were only signaled in the PPS, while in the current VVC spec, position of the virtual boundaries are signaled in SPS and PH. With the virtual boundary signaling in SPS and PH, the bit costs are more important. Currently, bit counts of both SPS and PH in VVC are considerably higher than HEVC, which makes it desirable in general to reduce the SPS and PH bit counts with reasonable means.

Proposal 1—Adding Constraints

It is proposed to add constraints to signal the locations of the virtual boundaries in order. The proposed order is left to right for vertical virtual boundaries and top to bottom for horizontal virtual boundaries. We propose to constrain four syntax elements, two of them sps_virtual_boundaries_pos_x[i] and sps_virtual_boundaries_pos_y[i] in the SPS and the other two ph_virtual_boundaries_pos_x[i] and ph_virtual_boundaries_pos_y[i] in the PH.

Proposed semantics for this proposal on top of JVET-Q2001-vE are shown below:

--- sps_virtual_boundaries_pos_x[ i ] specifies the location of the i-th
vertical virtual boundary in units of luma samples divided by 8. The value
of sps_virtual_boundaries_pos_x[ i ] shall be in the range
of 1 to Ceil( pic_width_max_in_luma_samples ÷ 8 ) − 1,
inclusive.
It is a requirement of bitstream conformance that for any two non-negative
integer values of m and n, when m is less than n, the value of
sps_virtual_boundaries_pos_x[ m ] shall be less than
sps_virtual_boundaries_pos_x[ n ].
...
sps_virtual_boundaries_pos_y[ i ] specifies the location of the i-th
horizontal virtual boundary in units of luma samples divided by 8. The
value of sps_virtual_boundaries_pos_y[ i ] shall be in the
range of 1 to Ceil( pic_height_max_in_luma_samples ÷ 8 ) − 1,
inclusive.
It is a requirement of bitstream conformance that for any two non-negative
integer values of m and n, when m is less than n, the value of
sps_virtual_boundaries_pos_y[ m ] shall be less than
sps_virtual_boundaries_pos_y[ n ].
...
ph_virtual_boundaries_pos_x[ i ] specifies the location of the i-th
vertical virtual boundary in units of luma samples divided by 8. The value
of ph_virtual_boundaries_pos_x[ i ] shall be in the range of
1 to Ceil( pic_width_in_luma_samples ÷ 8 ) − 1, inclusive.
It is a requirement of bitstream conformance that for any two non-negative
integer values of m and n, when m is less than n, the value of
ph_virtual_boundaries_pos_x[ m ] shall be less than
ph_virtual_boundaries_pos_x[ n ].
...
ph_virtual_boundaries_pos_y[ i ] specifies the location of the i-th
horizontal virtual boundary in units of luma samples divided by 8. The
value of ph_virtual_boundaries_pos_y[ i ] shall be in the range
of 1 to Ceil( pic_height_in_luma_samples ÷ 8 ) − 1,
inclusive.
It is a requirement of bitstream conformance that for any two non-negative
integer values of m and n, when m is less than n, the value of
ph_virtual_boundaries_pos_y[ m ] shall be less than
ph_virtual_boundaries_pos_y[ n ].

---

Proposal 2—Signaling of Virtual Boundaries

This disclosure proposes that the u(13) descriptors for the four syntax elements sps_virtual_boundaries_pos_x[i], sps_virtual_boundaries_pos_y[i], ph_virtual_boundaries_pos_x[i] and ph_virtual_boundaries_pos_y[i] are replaced by u(v) descriptors where v is derived from the maximum picture width and height for the two SPS syntax elements and from the picture width and height for the two PH syntax elements. By replacing the u(13) descriptors for the four syntax elements with u(v) descriptors, the bit cost of signaling virtual boundaries is reduced for all widths and heights smaller than 8×2$^{13}$=64 k luma samples.

Proposed syntax and semantics on top of JVET-Q2001-vE are shown below:

| | Descriptor |
|---|---|
| seq_parameter_set_rbsp( ) { | |
| ... | |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(v) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(v) |
|   } | |
| } | |
| ... | | sps_virtual_boundaries_pos_x[ i ] specifies the location of the i-th
vertical virtual boundary in units of luma samples divided by 8. The
length
of sps_virtual_boundaries_pos_x[ i ] is equal to Ceil( Log2(
Ceil( pic_width_max_in_luma_samples ÷ 8 ) − 1 ) ) bits. The value of
sps_virtual_boundaries_pos_x[ i ] shall be in the range of 1 to
Ceil( pic_width_max_in_luma_samples ÷ 8 ) − 1, inclusive.
sps_virtual_boundaries_pos_y[ i ] specifies the location of the i-th
horizontal virtual boundary in units of luma samples divided by 8. The
length of sps_virtual_boundaries_pos_y[ i ] is equal to Ceil( Log2(
Ceil( pic_height_max_in_luma_samples ÷ 8 ) − 1 ) ) bits. The value of
sps_virtual_boundaries_pos_y[ i ] shall be in the range of 1 to
Ceil( pic_height_max_in_luma_samples ÷ 8 ) − 1, inclusive.

---

| | Descriptor |
|---|---|
| picture_header_structure( ) { | |
| ... | |
| if( sps_virtual_boundaries_enabled_flag | |
| && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(v) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(v) |
|   } | |
| ... | | ph_virtual_boundaries_pos_x[ i ] specifies the location of the i-th
vertical virtual boundary in units of luma samples divided by 8. The
length
of ph_virtual_boundaries_pos_x[ i ] is equal to Ceil( Log2(
Ceil( pic_width_in_luma_samples ÷ 8 ) − 1 ) ) bits. The value of
ph_virtual_boundaries_pos_x[ i ] shall be in the range of 1 to
Ceil( pic_width_in_luma_samples ÷ 8 ) − 1, inclusive.
ph_virtual_boundaries_pos_y[ i ] specifies the location of the i-th
horizontal virtual boundary in units of luma samples divided by 8. The
length of ph_virtual_boundaries_pos_y[ i ] is equal to Ceil( Log2(
Ceil( pic_height_in_luma_samples ÷ 8 ) − 1 ) ) bits. The value of
ph_virtual_boundaries_pos_y[ i ] shall be in the range of 1 to
Ceil( pic_height_in_luma_samples ÷ 8 ) − 1, inclusive.

---

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a picture comprising a virtual boundary from a coded video bitstream, the method comprising:
    determining one or more of a maximum picture width or a maximum picture height from one or more syntax elements S1 in the coded video bitstream;
    determining one or more of a current picture width or a current picture height from one or more syntax elements S2 in the coded video bitstream;
    determining that a virtual boundary syntax element in the coded video bitstream is encoded with a bit length derived from one or more of the maximum picture width or the maximum picture height or one or more of the current picture width or the current picture height;
    deriving the bit length for the virtual boundary syntax element based on the one or more of the maximum picture width or maximum picture height as a result of determining that a virtual boundary syntax element in the coded video bitstream is encoded with a bit length derived from one or more of the maximum picture width or the maximum picture height or the one or more of the current picture width or the current picture height as a result of determining that a virtual boundary syntax element in the coded video bitstream is derived from one or more of the current picture width or the current picture height;
    decoding the virtual boundary syntax element from the bitstream based on the derived bit length; and
    determining a spatial picture position of the virtual boundary based on the decoded virtual boundary syntax element.

2. The method of claim 1, wherein the current picture width is not equal to the maximum picture width, and/or the current picture height is not equal to the maximum picture height.

3. The method of claim 1, further comprising:
    decoding the one or more syntax elements S2 from a header or parameter set A;
    decoding the one or more syntax elements S1 from a header or parameter set B.

4. The method of claim 3, wherein determining that a virtual boundary syntax element in the coded video bitstream is encoded with a bit length derived from (i) the one or more of a maximum picture width or a maximum picture height or (ii) the one or more of a current picture width or a current picture height comprises determining that the virtual boundary syntax element is part of one of the header or parameter set A or the header or parameter set B.

5. The method of claim 4, wherein determining that the virtual boundary syntax element is part of one of the header or parameter set A or the header or parameter set B comprises:
    decoding a flag from a header or parameter set C indicating the presence of one or more virtual boundaries; and
    determining that the value of the flag is equal to a value specifying that one or more virtual boundaries are present.

6. The method of claim 5, wherein the header or parameter set C is the same as at least one of the header or parameter set A; and the header or parameter set B.

7. The method of claim 3, wherein at least one of the header or parameter set A and the header or parameter set B is one of a slice header, a picture header, a picture parameter set (PPS), a sequence parameter set (SPS), a video parameter set (VPS), an adaptive parameter set (APS), and a decoding capability information (DCI), associated with the picture being decoded.

8. The method of claim 1, wherein deriving a bit length for the virtual boundary syntax element based on (i) the one or more of the maximum picture width or the maximum picture height or (ii) the one or more of the current picture width or the current picture height comprises:
    calculating the equation Ceil (Log 2 (Ceil (X÷N)−1)), where X refers to (i) one of the maximum picture width or the maximum picture height or (ii) one of the current picture width or the current picture height, N is a fixed value, and Ceil represents the ceiling function and Log 2 represents the base-2 logarithm.

9. The method of claim 1, wherein the determined spatial picture position of the virtual boundary is one of a horizontal position and a vertical position.

10. The method of claim 1, further comprising:
    disabling in-loop filtering across an edge of the virtual boundary based on the determined spatial picture position of the virtual boundary during decoding of the picture.

11. The method of claim 1, wherein decoding the virtual boundary syntax element from the bitstream based on the derived bit length comprises reading N bits from the coded video bitstream, wherein N is equal to the derived bit length for the virtual boundary syntax element.

12. The method of claim 1, further comprising decoding the picture based on the spatial picture position of the virtual boundary.

13. A carrier containing a computer program comprising instructions which when executed by processing circuitry of a decoder causes the decoder to perform the method of claim 1, wherein the carrier is one of an electronic signal, an optical signal, a radio signal, and a computer readable storage medium.

14. A method for decoding a current picture comprising a virtual boundary from a coded video bitstream, the method comprising:
    determining one or more of a maximum picture width or a maximum picture height from one or more syntax elements S1 in the coded video bitstream;
    determining one or more of a current picture width or a current picture height from one or more syntax elements S2 in the coded video bitstream;
    decoding a first syntax element from the coded video bitstream into a first value, wherein the first value specifies whether a spatial position of the virtual boundary is decoded using one or more of the maximum picture width or the maximum picture height, or one or more of the current picture width or the current picture height;
    if the first value is equal to a value that specifies that a spatial position of the virtual boundary is decoded using one or more of the maximum picture width or the maximum picture height, deriving a bit length for a virtual boundary syntax element based on one of the maximum picture width and the maximum picture height;

if the first value is equal to a value that specifies that a spatial position of the virtual boundary is decoded using one or more of the current picture width or the current picture height, deriving a bit length for the virtual boundary syntax element based on one or more of the current picture width or the current picture height;

decoding the virtual boundary syntax element by reading N bits from the coded video bitstream, wherein N is equal to the derived bit length for the virtual boundary syntax element;

determining a spatial picture position of the virtual boundary based on the decoded virtual boundary syntax element; and decoding the current picture using the spatial position of the virtual boundary.

15. The method of claim 14, wherein the current picture width is not equal to the maximum picture width, and/or the current picture height is not equal to the maximum picture height.

16. The method of claim 14, further comprising:

in response to determining that the first value is equal to a value that specifies that a spatial position of the virtual boundary is decoded using one or more of the maximum picture width or the maximum picture height, decoding the virtual boundary syntax element from a sequence parameter set; and in response to determining that the first value is equal to a value that specifies that a spatial position of the virtual boundary is decoded using one or more of the current picture width or the current picture height, decoding the virtual boundary syntax element from a picture parameter set.

17. The method of claim 14, further comprising decoding the first syntax element from a sequence parameter set.

18. A decoder for decoding a picture comprising a virtual boundary from a coded video bitstream, the decoder comprising processing circuitry and a memory containing instructions executable by the processing circuitry, whereby the decoder is configured to:

determine one or more of a maximum picture width or a maximum picture height from one or more syntax elements S1 in the coded video bitstream;

determine one or more of a current picture width or a current picture height from one or more syntax elements S2 in the coded video bitstream;

determine whether a virtual boundary syntax element in the coded video bitstream is encoded with a bit length derived from (i) one or more of the maximum picture width or the maximum picture height or (ii) one or more of the current picture width or the current picture height;

derive the bit length for the virtual boundary syntax element;

decode the virtual boundary syntax element from the bitstream based on the derived bit length; and determine a spatial picture position of the virtual boundary based on the decoded virtual boundary syntax element, wherein if it is determined that the virtual boundary syntax element in the coded video bitstream is encoded with a bit length derived from one or more of a maximum picture width or a maximum picture height, the bit length for the virtual boundary syntax element is derived based on the one or more of the maximum picture width or the maximum picture height, and if it is determined that the virtual boundary syntax element in the coded video bitstream is encoded with a bit length derived from one or more of a current picture width or a current picture height, the bit length for the virtual boundary syntax element is derived based on the one or more of the current picture width or the current picture height.

19. The decoder of claim 18, wherein the current picture width is not equal to the maximum picture width, and/or the current picture height is not equal to the maximum picture height.

20. A method for encoding a picture comprising a virtual boundary to form a coded video bitstream, the method comprising:

determining one or more of a maximum picture width or a maximum picture height;

determining one or more of a current picture width or a current picture height;

determining to encode a virtual boundary syntax element in the coded video bitstream with a bit length derived from one or more of the maximum picture width or the maximum picture height or one or more of the current picture width or the current picture height;

deriving the bit length for the virtual boundary syntax element based on the one or more of the maximum picture width or maximum picture height as a result of determining to encode a virtual boundary syntax element in the coded video bitstream with a bit length derived from one or more of the maximum picture width or the maximum picture height or the one or more of the current picture width or current picture height as a result of determining to encode a virtual boundary syntax element in the coded video bitstream with a bit length derived from one or more of a current picture width or a current picture height;

determining the virtual boundary syntax element based on a spatial picture position of the virtual boundary; and encoding the virtual boundary syntax element in the coded video bitstream based on the derived bit length.

21. The method of claim 20, wherein the current picture width is not equal to the maximum picture width, and/or the current picture height is not equal to the maximum picture height.

* * * * *